US007701492B2

(12) United States Patent
Motomura et al.

(10) Patent No.: US 7,701,492 B2
(45) Date of Patent: Apr. 20, 2010

(54) IMAGE-CAPTURING APPARATUS AND IMAGE CAPTURING METHOD

(75) Inventors: Hideto Motomura, Nara (JP); Katsuhiro Kanamori, Nara (JP)

(73) Assignee: Panasonic Corporation, Osaka (JP)

( * ) Notice: Subject to any disclaimer, the term of this patent is extended or adjusted under 35 U.S.C. 154(b) by 111 days.

(21) Appl. No.: 12/095,384

(22) PCT Filed: Feb. 7, 2007

(86) PCT No.: PCT/JP2007/052135

§ 371 (c)(1),
(2), (4) Date: May 29, 2008

(87) PCT Pub. No.: WO2007/094219

PCT Pub. Date: Aug. 23, 2007

(65) Prior Publication Data
US 2009/0268079 A1 Oct. 29, 2009

(30) Foreign Application Priority Data
Feb. 15, 2006 (JP) ............................. 2006-038683

(51) Int. Cl.
H04N 5/262 (2006.01)
(52) U.S. Cl. .............................. 348/240.2; 348/333.12
(58) Field of Classification Search . 348/240.99–240.2, 348/333.11–333.12, 231.99, 222.1
See application file for complete search history.

(56) References Cited

U.S. PATENT DOCUMENTS 5,933,187 A * 8/1999 Hirasawa et al. ....... 348/240.99

(Continued)

FOREIGN PATENT DOCUMENTS

JP 6-41281 5/1997

(Continued)

OTHER PUBLICATIONS

International Search Report issued May 1, 2007 in the International (PCT) Application of which the present application is the U.S. National Stage.

(Continued)

*Primary Examiner*—Tuan Ho
(74) *Attorney, Agent, or Firm*—Wenderoth, Lind & Ponack L.L.P.

(57) ABSTRACT

To provide an image-capturing apparatus and an image-capturing method which keeps, even when an object or a photographer moves, the object-missing capturing to a minimum and which allows recording for a longer period of time. The image-capturing apparatus (100) includes: a focal length calculating unit (103) which calculates the focal length of the multifocal optical lens so that the zoom factor becomes smaller than a set zoom factor when movement is detected, and calculates the focal length so that the zoom factor becomes equivalent to the set zoom factor when movement is not detected; a recording media unit (108) for storing a captured image and the zoom factor along with time; a frame area setting unit (111) which sets, according to the zoom factor, a frame ICF to be clipped out of the captured image that is an output from the pickup device unit (104); an electronic zoom processing unit (112) which generates, through electronic zoom, a framing image (IDF) from the frame area (ICF); and a framing image display unit (113) which displays the framing image (IDF).

16 Claims, 35 Drawing Sheets

U.S. PATENT DOCUMENTS 6,670,989 B2 * 12/2003 Kawanishi et al. ..... 348/240.99
2004/0257459 A1 * 12/2004 Shim ..................... 348/333.02

FOREIGN PATENT DOCUMENTS

| JP | 11-289486 | 10/1999 |
|---|---|---|
| JP | 2005-012423 | 1/2005 |

OTHER PUBLICATIONS

"Hard disk movie, main specification," Internet<URL: http://www.jvc-victor.co.jp/dvmain/gz-mg70/spec.html>, © Copyright 2005.

* cited by examiner

FIG. 1A  PRIOR ART
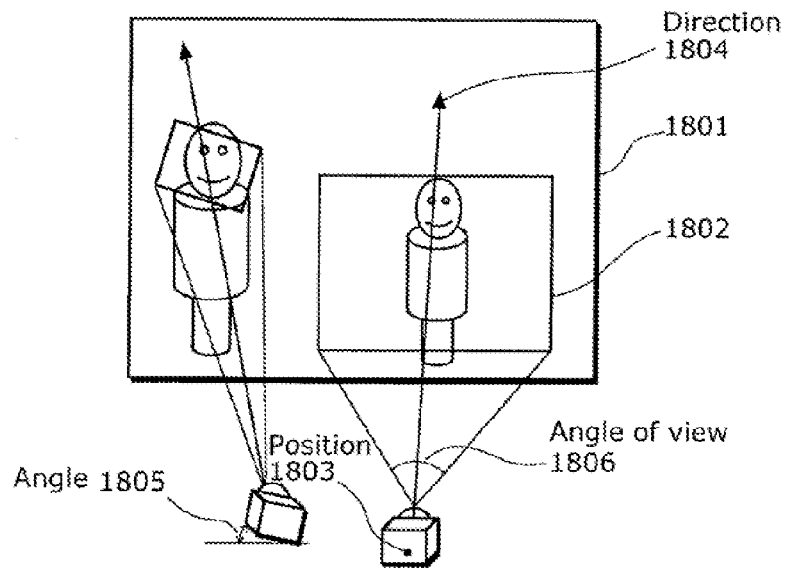
FIG. 1B  PRIOR ART
| Position | Tracking, booming, dollying |
| Direction | Panning, tilting |
| Angle | Rolling |
| Angle of view | Dollying, zooming |
1807
FIG. 1C  PRIOR ART
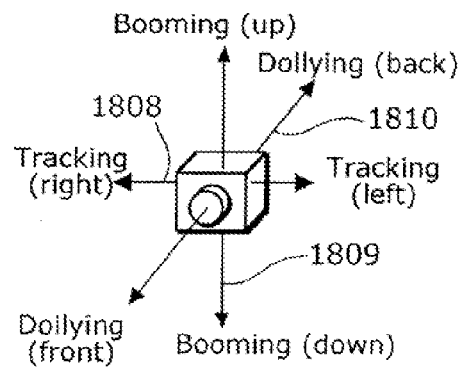
FIG. 1D  PRIOR ART
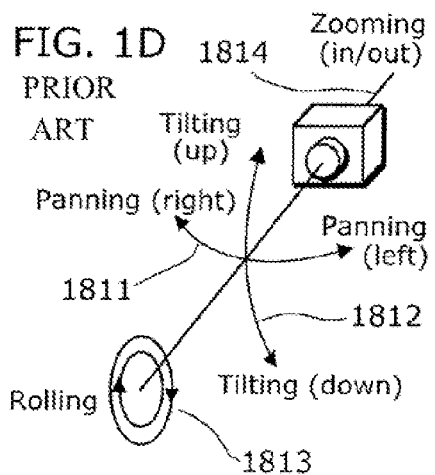

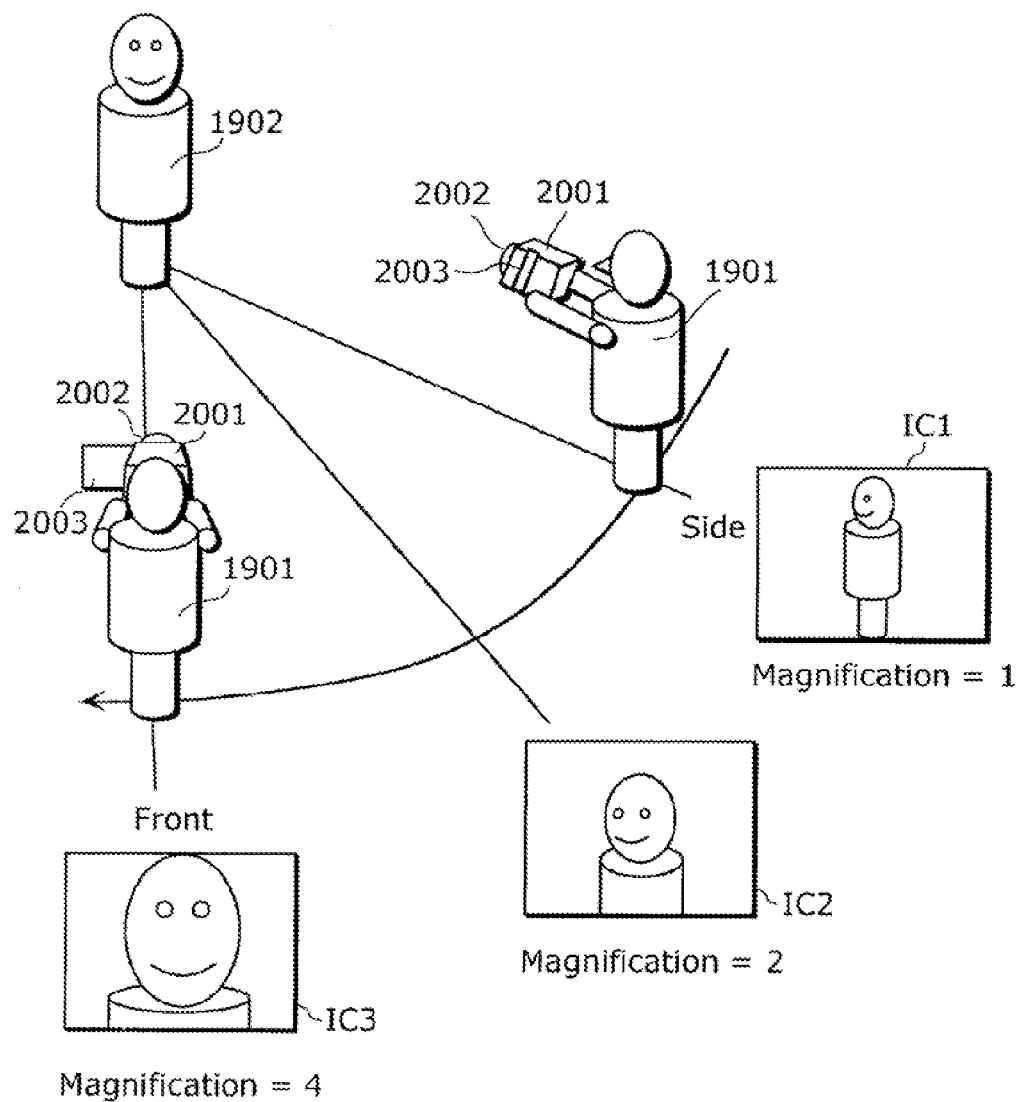

Image feature vector (w1, w2, ···, wp)

P = 3n + 1

FIG. 18A
FIG. 18B
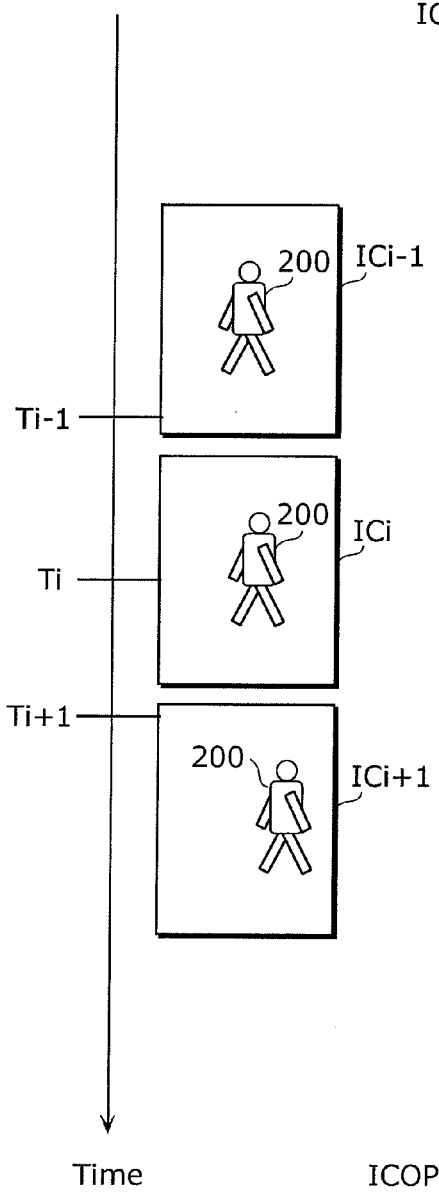
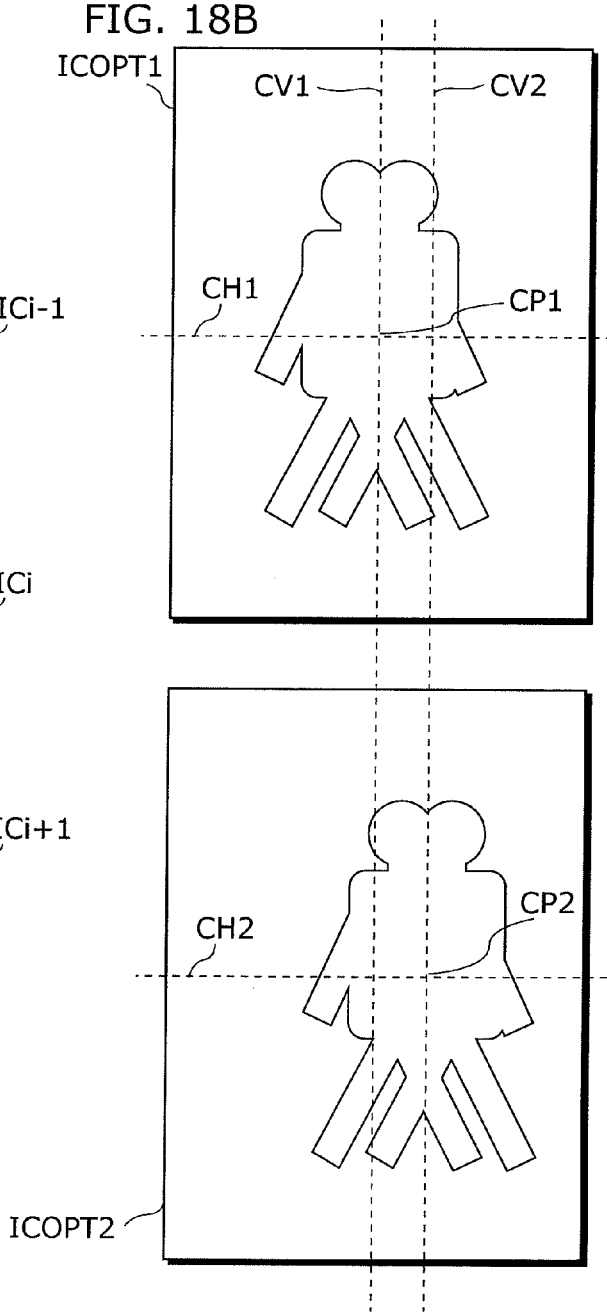

FIG. 20
| Memory address | Recording details | | |
|---|---|---|---|
| 0000 .... IFFF | Frame area ICF Storage area  | — | |
| 2000 .... .... .... .... IFFF | Outer-frame area ICM Storage area 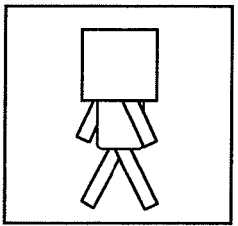 | Storage area for object movement degree | Storage area for image-capturing-apparatus movement degree |
601

IDW

IDF

IDWF

IMAGE-CAPTURING APPARATUS AND IMAGE CAPTURING METHOD

TECHNICAL FIELD

The present invention relates to image capturing, and also relates to a technique for recording an image separately from a capturing intention.

BACKGROUND ART

In recent years, as a result of digitalization of various apparatuses and advancement of integration technology, cameras that can digitally record videos, that is, digital video cameras have become widespread. Digital recording is highly compatible with other media, and thus becoming widely used for commercial use in various usage patterns, such as network distribution and video editing.

A camera, as shown in FIG. 1A, clips a part out of a scene 1801 and stores the clipped part as image data. The clipping position is determined by the photographer according to the photographer's capturing intention, and this is referred to as framing in the sense that a clipping frame 1802 is set in the scene. Framing is determined by the four following factors: a position 1083; a direction 1804; an angle 1805 (the camera is held widthwise, lengthwise, or at an angle); and an angle of view 1806 of the camera. Among these, the position of the camera is adjusted, as shown in the table 1807 in FIG. 1B and FIG. 1C, through: tracking 1808 (horizontal right-and-left movement), booming 1809 (vertical movement), and dollying 1810 (horizontal back-and-forth movement). In addition, the direction of the camera is adjusted, as shown in FIG. 1D, through: panning 1811 (horizontal rotation centering on the camera) and tilting 1812 (vertical rotation centering on the camera). In addition, the rotation of the camera is adjusted, as shown in FIG. 1D, through rolling 1813 (rotation centering on an optical-axis). The angle of view of the camera is adjusted through the dollying 1810 and the zooming 1814. For zooming, optical zoom for changing the focal length of an optical system and electronic zoom by image processing are used. As described above, framing is determined by the photographer, using seven types of camera work from the tracking 1808 to the zooming 1814.

The photographer can create various framings according to the capturing intention by selectively using the camera work shown in figures from FIG. 1A to FIG. 1D. For example, FIG. 2 is a diagram showing an example of capturing in which a photographer 1901 increases the zoom factor (zooms in) while moving from side to front with an object 1902 being the center, by continuously increasing the focal length of a multifocal lens 2002 of a video camera 2001. Here, Images IC1, IC2, and IC3 show captured images displayed in a viewfinder 2003 of the video camera 2001 and correspond to 1-power zoom, 2-power zoom, and 4-power zoom, respectively. In this exemplary capturing, the photographer 1901 carries out tracking and panning using body movement and rotation while carrying out zooming.

As described above, by selectively using the seven types of camerawork arbitrarily, it is possible to set various framings so as to enhance the expressiveness of images. At the same time, however, there is a case where due to a high degree of arbitrariness the camera work becomes out of the reasonable control well suited to the capturing intention and where the framing becomes inappropriate. For example, FIG. 3 is an example of capturing in which the object is missing, since the object 1902 moves rightward and thereby tracking and panning becomes out of the reasonable control, and the object 1902 is missing from the frame (becomes frame-out). In the example, as FIG. 2 shows, the framing is not properly set to be well suited to the capturing intention to constantly hold the object 1902 at the center of the screen. The object 1902 moves rightward as time progresses from Time T1, Time T2, and Time T3, and the photographer 1901 is not able to control tracking and panning appropriately. As shown in Image IC4, the object 1902, captured at the center of the screen at Time T1, is off to the right at Time T2 as shown in Image IC5, and subsequently becomes frame-out to the right of the screen at Time T3, as shown in Image IC6, resulting in capturing in which the object is missing.

In order to solve the problem as described above that the framing cannot be set according to the capturing intention, a technique for resetting the framing after capturing is disclosed (for example, see Patent Reference 1). In other words, as FIG. 4A shows, such object-missing capturing is prevented by decreasing the focal length (to, for example, 35 mm) of the multifocal lens 2002 of the video camera 2001 so as to allow wide-angle capturing, and capturing the object 1902 with an angle of view 2102 being secured. Although the captured image, as Image IC7 shown in FIG. 4B, holds the object 1902 within the frame, the framing is off to the right of the screen due to inappropriate control of tracking and panning. In Image IC6 in FIG. 3, the focal length of the multifocal lens 2002 of the video camera 2001 is increased (to, for example, 140 mm) so as to narrow the angle of view, like the angle of view 2102, so that an image captured at a 4-power zoom factor is obtained as a frame 2201. Thus, as shown in Image IC3 in FIG. 2, in order to meet the capturing intention to hold the object 1902 at the center of the screen, Image IC8 is clipped out using the frame 2202, and the clipped image is displayed in the viewfinder 2003. The framing, which is the frame 2201 at the time of capturing, is reset to the frame 2202 after capturing, so that the framing well suited to the capturing intention is secured.

In addition, Patent Reference 1 discloses that a high-resolution pickup device having large numbers of pixels and lines is used as a measure to cope with deterioration of image quality caused by electric zoom that is zooming by image processing. When the focal length of the multifocal lens 2002 is increased by four times, for example, from 35 mm to 140 mm, the angle of view is changed from the angle of view 2101 to the angle of view 2102, and the object 1902 is displayed in four times the size of the object 1902 in the case of the angle of view 2101. Assuming that the numbers of pixels and lines of the pickup device for the video camera 2001 are identical to those of the viewfinder 2003, and assuming, for example, the case of 640 pixels×480 lines, the area intended to be displayed in the viewfinder 2003 is reduced to ¼, when wide-angle capturing is performed at the angle of view 2101 so as to prevent the object 1902 from becoming frame-out. Thus, when Image IC7 is obtained with 640 pixels×480 lines, the frame 2202 intended to be clipped out should be of 160 pixels×120 lines. Therefore, in order to display the image in the viewfinder 2003 having 640 pixels×480 lines, it is necessary to perform 4-power magnification by image processing. Patent Reference 1 discloses that in order to avoid the image being magnified by image processing, the numbers of pixels and lines of the pickup device of the video camera 2001 are increased, and only the clipping process is performed, so that an image equivalent to a 4-power optical zoom image captured at the angle of view 2102 is obtained. That is, when the image size in the viewfinder 2003 is of 640 pixels×480 lines, 2560 pixels×1920 lines is used for the pickup device.

Patent Reference 1: Japanese Unexamined Patent Application Publication No. 2005-12423 (FIG. 3)

Non-Patent Reference 1: Victor Company of Japan, Limited, "Hard disk movie, main specification" [Searched Feb. 10, 2006] Internet<URL: http://www.jvc-victor.co.jp/dvmain/gz-mg70/spec.html>

DISCLOSURE OF INVENTION

Problems that Invention is to Solve

However, the prior art presents a problem that the recording capacity of a recording medium on which captured images are stored is not taken into account. For example, in the case where a pickup device of 2560 pixels×1920 lines is used, the capacity of an RGB 24-bit frame image is approximately 14.7 MB; when 30 frames are captured per minute, the recording capacity per minute becomes approximately 441 MB. For example, assuming that the video camera in Non-Patent Reference 1 is used, and with the capacity of the hard disk being 30 GB, the disk capacity is used up in approximately 68 seconds when images are recorded according to the method disclosed in Patent Reference 1. In addition, assuming that the video camera in Non-Patent Reference 1 is used, with video-recording time being 7 hours (when the image quality mode is set to the maximum level), the data volume must be reduced to approximately 0.3%, in order to record the 7-hour video on the 30-GB hard disk.

Therefore, the present invention is conceived in view of the above circumstances, and has an object to provide an image-capturing apparatus and a capturing method which keep the object-missing capturing to a minimum even when the object or the photographer moves, and which also allow recording for longer periods of time.

Means to Solve the Problems

In order to achieve the object, an image-capturing apparatus according to the present invention is an image-capturing apparatus which captures an image of an object while changing a zoom factor by control of a focal length of a multifocal optical lens, and the image-capturing apparatus includes: an object movement detecting unit which detects a movement of the object; an image-capturing-apparatus movement detecting unit which detects a movement of the image-capturing apparatus; a focal length calculating unit which calculates the focal length of the multifocal optical lens so that the zoom factor becomes lower than a set zoom factor in at least one of the cases where the movement of the object is detected by the object movement detecting unit, and where the movement of the image-capturing apparatus is detected by the image-capturing-apparatus movement detecting unit, and to calculate the focal length of the multifocal optical lens so that the zoom factor becomes equivalent to the set zoom factor in the cases where the movement of the object is not detected by the object movement detecting unit, and where the movement of the image-capturing apparatus is not detected by the image-capturing-apparatus movement detecting unit; a focal length control unit which controls the focal length so that the focal length of the multifocal optical lens is adjusted to the focal length calculated by the focal length calculating unit; a frame area setting unit which clips a frame area out of the optical zoom image having been formed through the multifocal optical lens, the frame area being an area of which a position and a size are determined according to the zoom factor; an electronic zoom processing unit which changes the size of the image in the frame area clipped by the frame area setting unit, through electronic zoom, to a size for displaying the image; a framing image display unit which displays one of an electronic zoom image and the optical zoom image, the electronic zoom image having been electronic-zoomed by the electronic zoom processing unit; and a recording media unit in which the zoom factor and the optical zoom image are stored.

Effects of the Invention

With the image-capturing apparatus and the capturing method in the present invention, in the case where the object or the video camera moves and the framing cannot be controlled according to the capturing intention, the framing can be modified by clipping an image out of an image captured at a wide angle. In addition, when the possibility of resetting the framing is low, it is possible to extend video-recording time by reducing the volume to be recorded on the recording medium. Furthermore, it is also possible to extend the video-recording time through adaptive management of the data on the recording medium according to different levels of possibility of being used as display images.

BRIEF DESCRIPTION OF DRAWINGS

FIG. 1A is a diagram showing the background art for the present invention.

FIG. 1B is a diagram showing the background art for the present invention.

FIG. 1C is a diagram showing the background art for the present invention.

FIG. 1D is a diagram showing the background art for the present invention.

FIG. 2 is a diagram showing the background art for the present invention.

FIG. 18A is a diagram showing a method for calculating the degree of movement of an object.

FIG. 18B is a diagram showing a method for calculating the degree of movement of an object.

FIG. 20 is a diagram describing a method by which a captured image data unit identifies, using memory addresses, a storage area for a frame area ICF and a storage area for an outer-frame area ICM.

Figure 3:
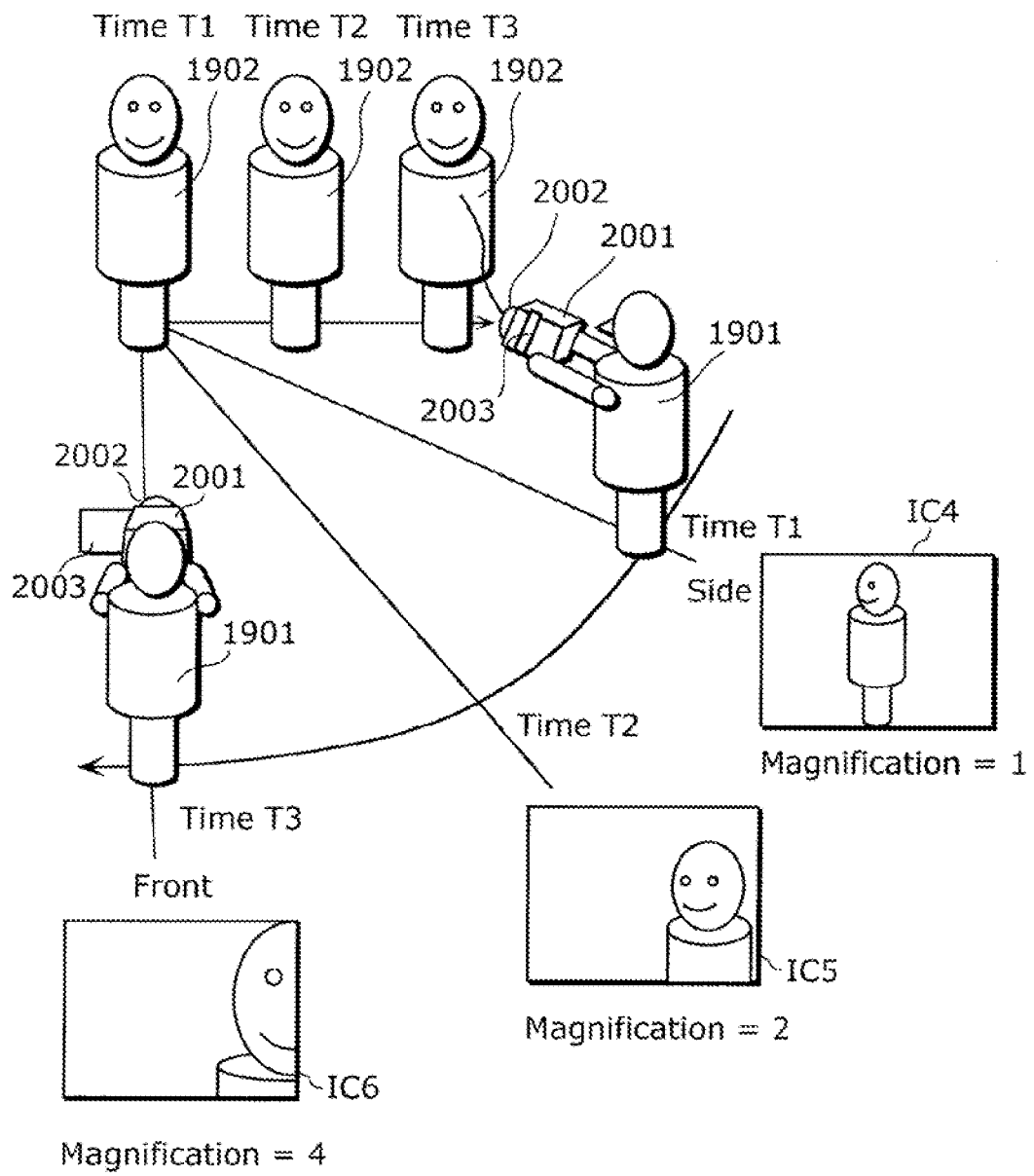
FIG. 3 is a diagram showing the background art for the present invention.
Figure 4A:
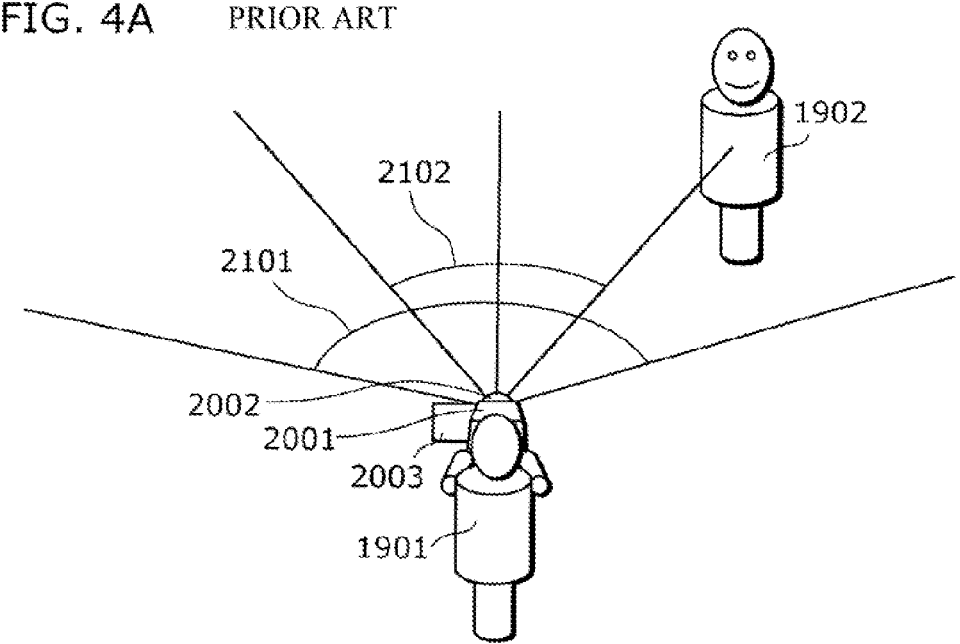
FIG. 4A is a diagram showing the background art for the present invention.
Figure 4B:
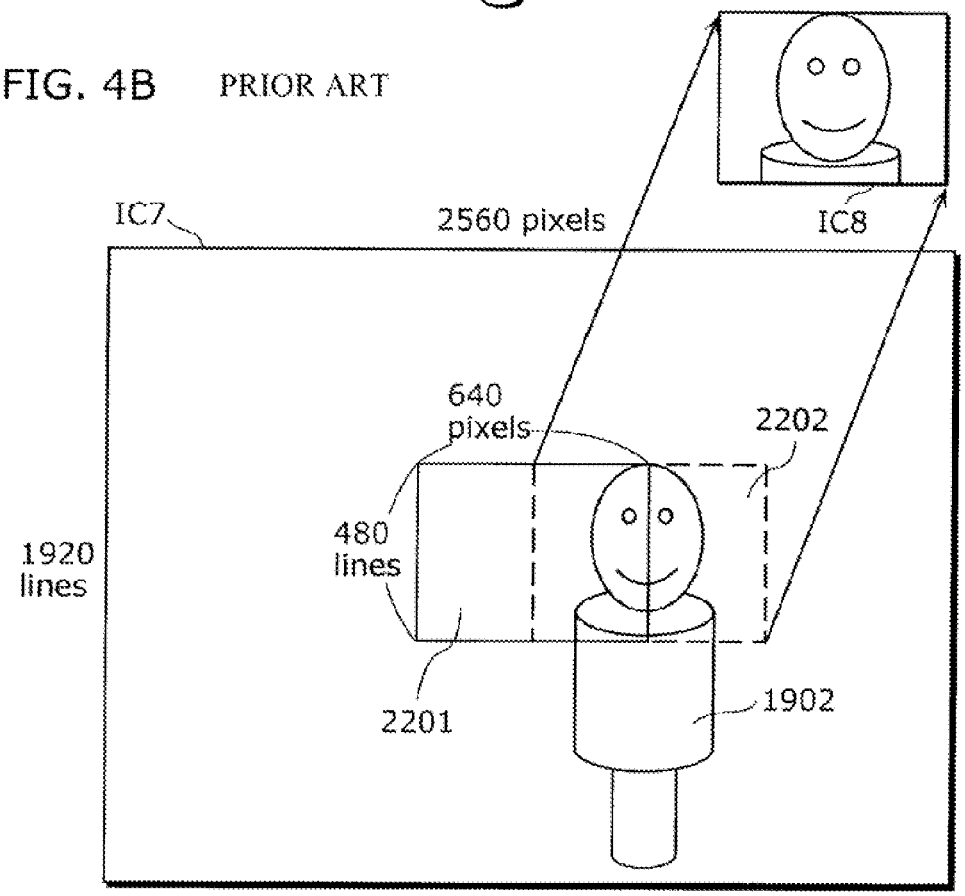
FIG. 4B is a diagram showing the background art for the present invention.

NUMERICAL REFERENCES 100, 400, 500, 600, 700, 800, 900, 1000, 1700 Image-capturing apparatus
101 Multifocal optical lens unit
102 Focus control unit
103 Focal length calculating unit
104 Pickup device unit
105 Zoom factor setting unit
106 Object movement detecting unit
107 Image-capturing-apparatus movement detecting unit
108 Recording media unit
109 Framing resetting unit
110 Framing change unit
111 Frame area setting unit
112 Electronic zoom processing unit
113 Framing image display unit
114 Posture sensor unit 114
200 Object

BEST MODE FOR CARRYING OUT THE INVENTION

An image-capturing apparatus according to the present invention is an image-capturing apparatus which captures an image of an object while changing a zoom factor by control of a focal length of a multifocal optical lens, and the image-capturing apparatus includes: an object movement detecting unit which detects a movement of the object; an image-capturing-apparatus movement detecting unit which detects a movement of the image-capturing apparatus; a focal length calculating unit which calculates the focal length of the multifocal optical lens so that the zoom factor becomes lower than a set zoom factor in at least one of the cases where the movement of the object is detected by the object movement detecting unit, and where the movement of the image-capturing apparatus is detected by the image-capturing-apparatus movement detecting unit, and to calculate the focal length of the multifocal optical lens so that the zoom factor becomes equivalent to the set zoom factor in the cases where the movement of the object is not detected by the object movement detecting unit, and where the movement of the image-capturing apparatus is not detected by the image-capturing-apparatus movement detecting unit; a focal length control unit which controls the focal length so that the focal length of the multifocal optical lens is adjusted to the focal length calculated by the focal length calculating unit; a frame area setting unit which clips a frame area out of the optical zoom image having been formed through the multifocal optical lens, the frame area being an area of which a position and a size are determined according to the zoom factor; an electronic zoom processing unit which changes the size of the image in the frame area clipped by the frame area setting unit, through electronic zoom, to a size for displaying the image; a framing image display unit which displays one of an electronic zoom image and the optical zoom image, the electronic zoom image having been electronic-zoomed by the electronic zoom processing unit; and a recording media unit in which the zoom factor and the optical zoom image are stored.

Specifically, first, in the case where the object or the image-capturing apparatus moves, assuming that a framing not appropriate for the capturing intention is likely to occur, wide-angle capturing is selected so as to prevent the object-missing capturing. That is, when the movement of the object or the image-capturing apparatus is detected, the optical zoom is switched to wide-angle capturing (with the focal length of the multifocal lens being decreased), the scene is captured in a wider range, and the object is held within the angle of view. For displaying the image in the viewfinder with which the photographer confirms the framing, electronic zoom is used; for example, in the case where the photographer sets the zoom factor to 4-power, an area corresponding to the 4-power zoom factor is clipped, for the frame area, out of the image captured at the wide angle and magnified to be sized as an image to be displayed in electronic zoom in the view finder. On the recording medium, the wide-angle image determined in optical zoom and the zoom factor specified by the photographer are stored. By referring to the zoom factor, the photographer can specify, on the image captured at the wide angle, the frame area confirmed with the viewfinder, and the outer-frame area other than the frame area can be used for the resetting of the framing.

Secondly, in the case where the object and the image-capturing apparatus are both stationary, assuming that the framing can be easily controlled according to the capturing intention, only the frame area that is set at the time of capturing is stored on the recording medium, and an outer frame area is not provided. Accordingly, for displaying the image in the viewfinder with which the photographer confirms the framing, the image having been captured in optical zoom is used without modification, and electronic zoom does not operate (with the zoom factor being set to 1-power). Therefore, in the case where no movement is detected in the object or the image-capturing apparatus, only the image size necessary for display is stored on the recording medium, thereby reducing the volume to be recorded.

With this, it is possible to set the framing according to the capturing intention by using both the optical control (optical zoom) and electronic control (electronic zoom) of zooming, and display to the photographer an image well suited to the capturing intention. In addition, even when the object or the photographer moves, it is possible to keep the object-missing capturing to a minimum, and also make a recording for a longer period of time.

In addition, the image-capturing apparatus may further include: a framing resetting unit which resets at least one of the zoom factor stored in the recording media unit and a position of the frame area on the optical zoom image, the position of the frame area being determined according to the zoom factor; and a framing change unit which clips the frame area out of the optical zoom image stored in the recording media unit, using the zoom factor and the position of the frame area on the optical zoom image that have been reset by the framing resetting unit.

In addition, the image-capturing apparatus may further include: a compression coding unit which performs compression coding on an image in the frame area and an image in an outer-frame area at separate compression rates, the outer-frame area being an area other than the frame area within the optical zoom image; and an extension decoding unit which performs extension decoding on the images in the frame area and the outer-frame area that have been compression-coded at the separate compression rates. With this, it is possible to reduce the volume to be recorded on the recording medium. In other words, since the outer-frame area is not used as long as the framing is not reset, and since there is a low possibility that the entire outer-frame area is selected in the resetting of the framing, the outer-frame area gives more priority to reduction of the volume to be recorded by relatively increasing the compression rate, whereas the frame area gives priority to the image quality by relatively decreasing the compression rate.

In addition, the image-capturing apparatus may further include: an address adjustment unit which manages addresses of the frame area and an outer-frame area separately on the recording media unit, the outer-frame area being an area other than the frame area within the optical zoom image; and a capacity management unit which overwrites the address of the outer-frame area with data in the frame area, in the case where a recording capacity of the recording media unit has reached an upper limit. With this, it is possible to extend the time period for recording the image of the frame area more important for the photographer.

In addition, the frame area setting unit may detect regularity from the movement of the image-capturing apparatus detected by the image-capturing-apparatus movement detecting unit, and move, based on the detected regularity, the frame area within the optical zoom image in order to foresee the framing. With this, since, in addition to the movement of the image-capturing apparatus, the frame area is moved in the moving direction of the image-capturing apparatus within the optical-zoomed image, the object can be captured in a shorter period of time, thereby keeping the object-missing capturing to a minimum.

In addition, the frame area setting unit may also move the frame area within the optical zoom image to an area in which the movement of the object has been detected, in the case where the movement of the object detected by the object movement detecting unit is larger than a predetermined change. With this, since the frame area can be shifted to a person who suddenly speeds up the movement, a person who suddenly stops moving, or the like, it becomes possible, for example, for a monitoring camera to automatically capture an important area in detail.

In addition, the image-capturing apparatus may further include: an image feature detecting unit which detects, from the optical zoom image, at least one of a specific color and a specific image pattern, and the focal length calculating unit may calculate the focal length of the multifocal optical lens so that the zoom factor becomes lower than the set zoom factor in the case where at least one of the specific color and the specific image pattern is detected by the image feature detecting unit, and the frame area setting unit moves the frame area within the optical zoom image so that the specific color and the specific image pattern which are detected by the image feature detecting unit are included in the frame area. With this, since the frame area can be moved to an area including a specific color and a specific image pattern, it becomes possible, for example, for a monitoring camera to automatically capture an important area in detail.

Note that the present invention can be realized not only as such an image-capturing apparatus but also an image-capturing method which includes, as steps, characteristic units included in such an image-capturing apparatus and a program which causes a computer to execute these steps. Furthermore, it goes without saying that such a program can be distributed, through recording media such as CD-ROMs and transmission media such as the Internet.

Hereinafter, embodiments of the present invention shall be described with reference to the drawings.

First Embodiment

In this embodiment, an image-capturing apparatus shall be described which selectively uses optical zoom and electronic zoom according to the detection of the movement of an object or a video camera so as to keep to a minimum the possibility of object-missing capturing in which the object is off the angle of view, and which also keeps the recording volume of a video to be recorded to a minimum.

Figure 5:
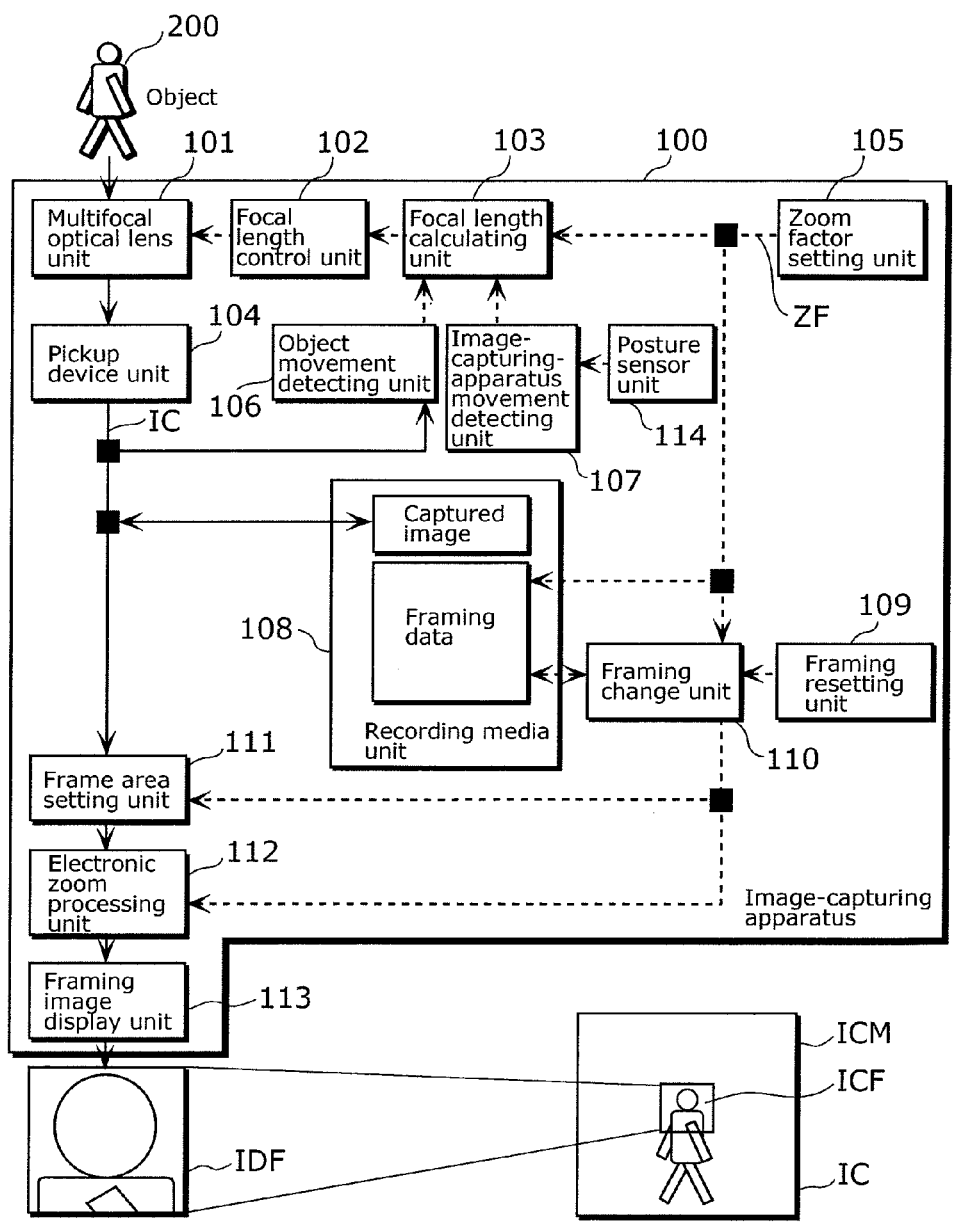
FIG. 5 is a block diagram showing the configuration of an image-capturing apparatus according to a first embodiment of the present invention.

FIG. 5 is a block diagram showing the configuration of an image-capturing apparatus according to a first embodiment of the present invention.

An image-capturing apparatus 100 is an apparatus for capturing an image of an object 200, and includes: a multifocal optical lens unit 101, a focal length control unit 102, a focal length calculating unit 103, a pickup device unit 104, a zoom factor setting unit 105, an object movement detecting unit 106, an image-capturing-apparatus movement detecting unit 107, a recording media unit 108, a framing resetting unit 109, a framing change unit 110, a frame area setting unit 111, an electronic zoom processing unit 112, a framing image display unit 113, and a posture sensor unit 114. A solid line shows the flow of video data, and a dotted line shows the flow of control data.

Figure 6:
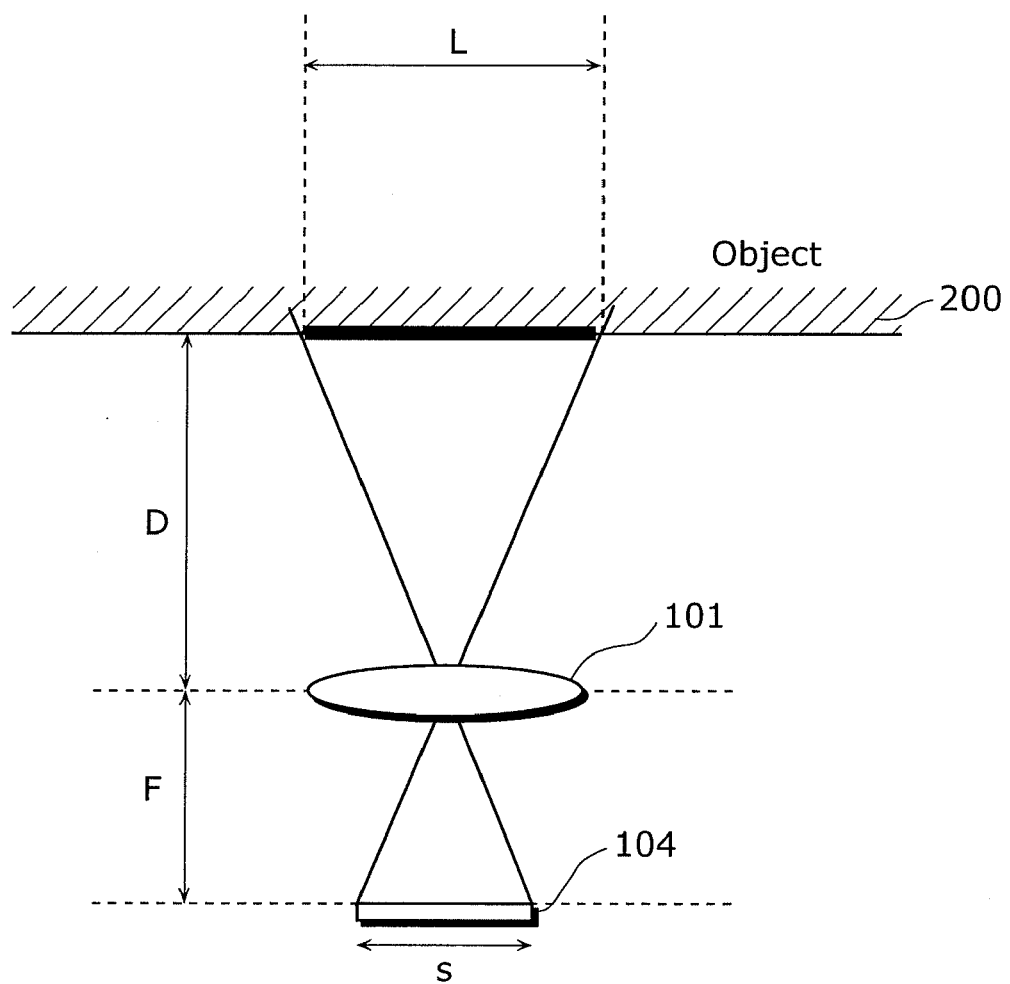
FIG. 6 is a diagram showing the relationship between, a focal length F, an angle of view L, a capturing distance D, and the size of a pickup device S.

The multifocal optical lens unit 101 changes, by changing the focal length, the angle of view of a captured image IC to be imaged in the pickup device unit 104. The focal length is calculated by the focal length calculating unit 103 according to the zoom factor ZF that is set by the zoom factor setting unit 105, so that the focal length of the multifocal optical lens unit 101 is set through the focal length control unit 102. FIG. 6 shows the relationship between the focal length F, the length L of the object 200 to be captured (equivalent to the view of angle), the distance D between the object 200 and the multifocal optical lens unit 101, and the size S of the pickup device unit 104, and these have a relationship as the following (Expression 1) shows.

[Expression 1]

$$F = \frac{S}{L}D \quad \text{(Expression 1)}$$

The focal length F is in inverse relation to the angle of view L: for example, when the focal length F is increased, by four times, from 35 mm to 140 mm, the angle of view L becomes narrower by a quarter, and an enlarged image at 4-power magnification can be captured.

In the zoom factor setting unit 105, the zoom factor ZF is set by the photographer. It is assumed that the zoom factor ZF is 1-power, when the focal length of the multifocal optical lens unit 101 is the shortest and when the angle of view is the widest. The zoom factor ZF set in the zoom factor setting unit 105 is inputted to the focal length calculating unit 103, the recording media unit 108, and the framing change unit 109.

The object movement detecting unit 106 detects the movement of the object 200, and the image-capturing-apparatus movement detecting unit 107 detects the movement of the image-capturing apparatus 100. When at least one of the movement of the object 200 and the movement of the image-capturing apparatus 100 is detected, the result of the detection is inputted to the focal length calculating unit 103. The focal length calculating unit 103 sets the focal length to the shortest (for example, 35 mm), and the multifocal optical lens unit 101 is set to 1-power optical zoom at which the angle of view is the widest. The purpose of this operation is to prevent missing the object in capturing, assuming that there is a low possibility of the photographer becoming unable to control the framing according to the capturing intention and the object 200 disappearing from the angle of view, when at least one of the object 200 and the image-capturing apparatus 100 moves. Conversely, in the case where the object 200 does not move and where the image-capturing apparatus 100 does not move, there is a low possibility of the object 200 disappearing from the angle of view and being missed in the capturing; therefore, the focal length calculating unit 103 outputs, to the focal length control unit 102, the zoom factor ZF (for example, 4-power) that is assigned by the zoom factor setting unit 105, and the multifocal optical lens unit 101 is set to 4-power optical zoom (for example, 140 mm in the case where 35 mm is assumed as 1-power).

Figure 7A:
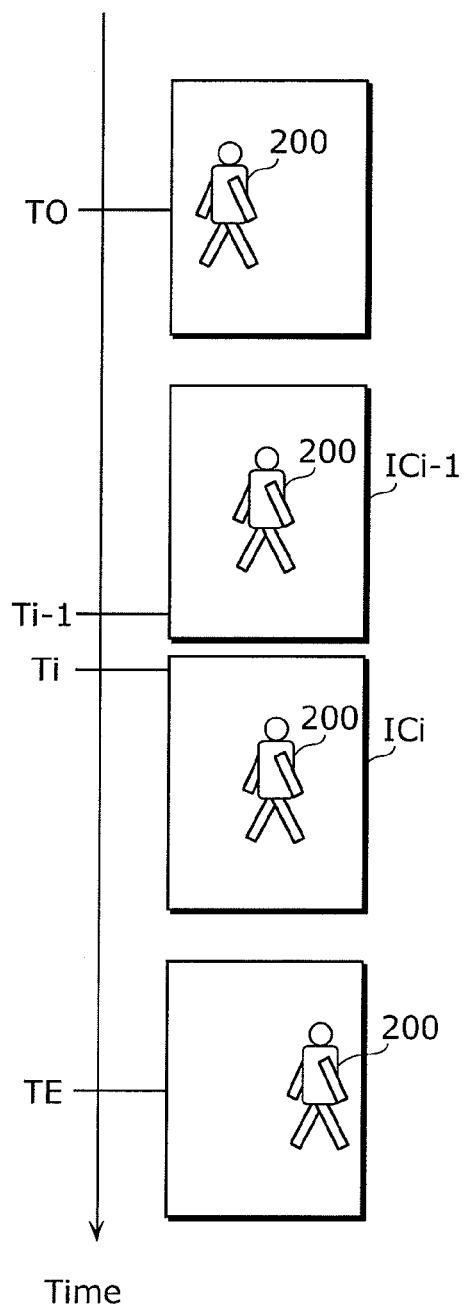
FIG. 7A is a diagram describing an exemplary method for detecting the movement of an object.
Figure 7B:
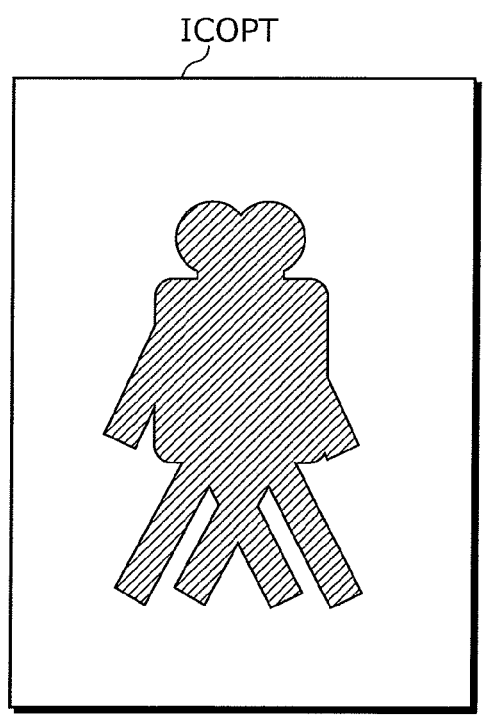
FIG. 7B is a diagram describing an exemplary method for detecting the movement of an object.

In the present invention, the method for detecting the movement of the object is arbitrary, but, as FIGS. 7A and 7B show, for example, a method for calculating difference between two images captured at different times is used. FIG. 7A is the case where the object 200 moves rightward between Time T0 and Time TE, assuming that the image-capturing apparatus 100 is stationary. A continuous period of Time Ti−1 that is between Time T0 and TE, and Time Ti are considered, and captured images are assumed as a captured image ICi−1 and a captured image ICi, respectively. The interval between Time Ti−1 and Time Ti depends on the frame rate and is normally 1/30 second. The image ICOPT shown in FIG. 7B is a result of the difference, calculated in units of pixels, between the captured image ICi−1 and the captured image ICi, and pixels having different pixel values are shown shaded. In fact, since there are various noises, including camera noise and subtle movements in the background, a threshold value is provided for the difference value, and it is judged that there is a movement when the threshold value is exceeded. In addition, the threshold value is set not only for pixel values but also for the number of pixels, and the movement is considered and ignored as noise when the difference value does not exceed the threshold value for the number of pixels.

Figure 8:
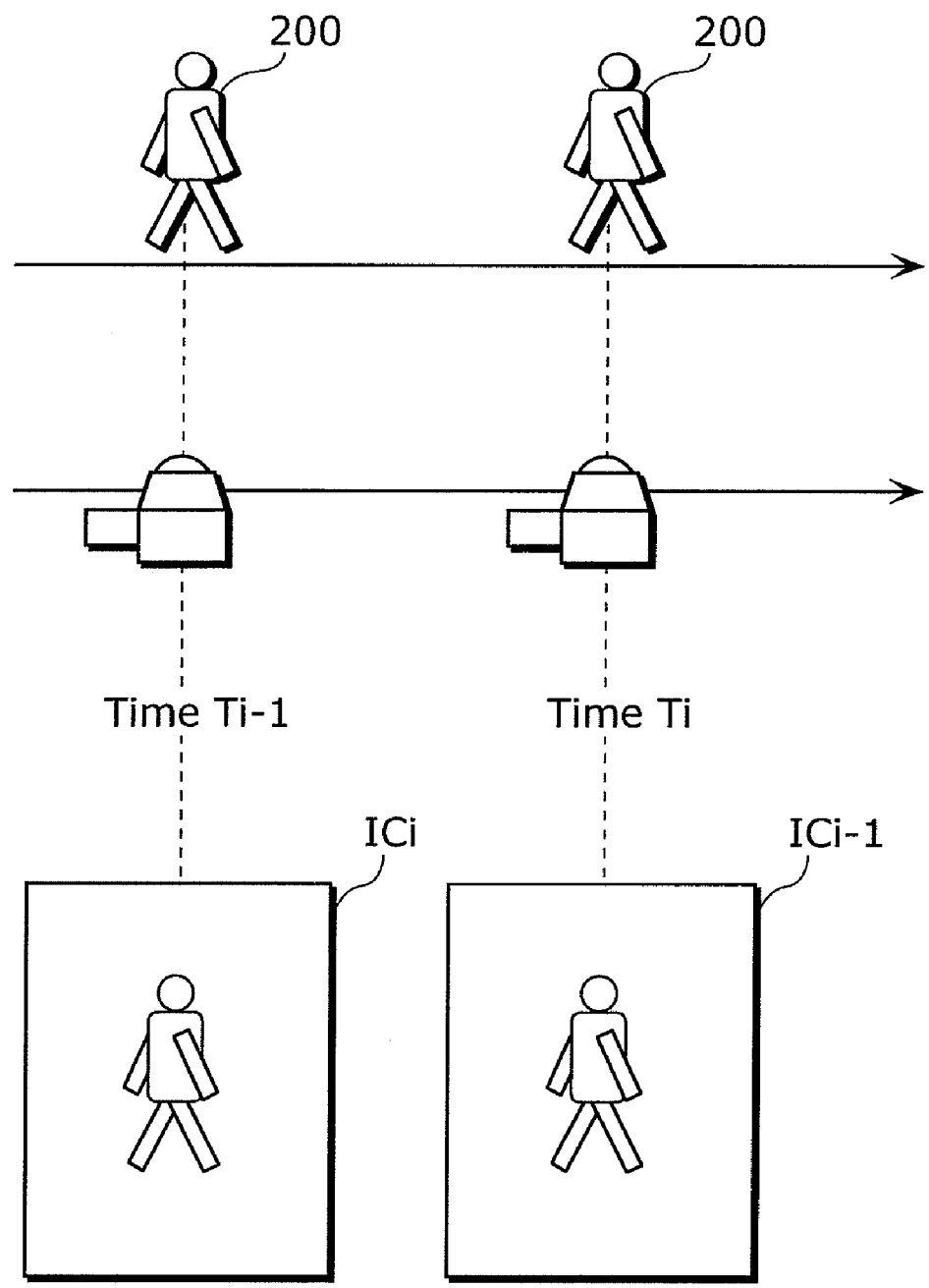
FIG. 8 is a diagram describing an example in which a relative positional relationship between the image-capturing apparatus and the object at Time Ti−1 and Time Ti is stored.
Figure 9:
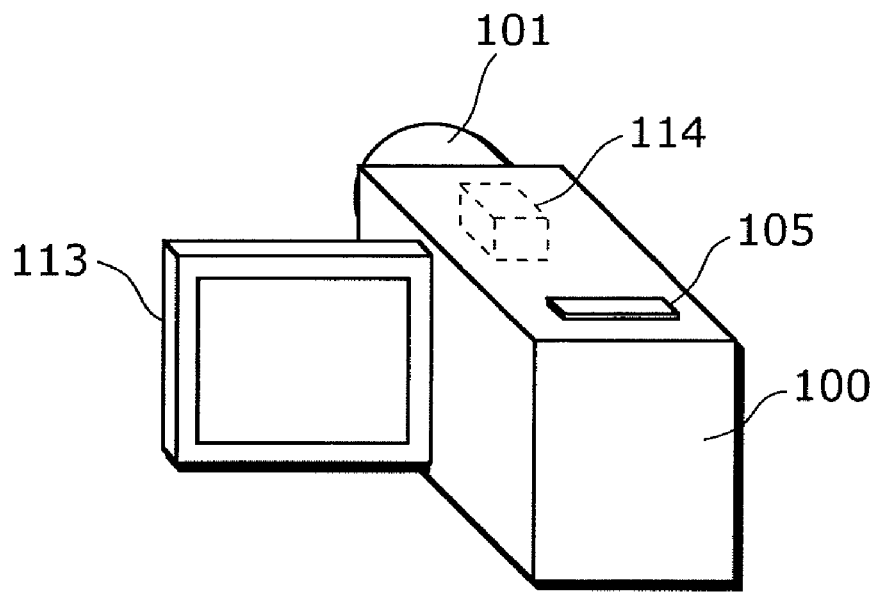
FIG. 9 is a diagram showing a method of detecting the movement of the image-capturing apparatus.

In the above description, it is assumed that the image-capturing apparatus 100 is stationary. Conversely, when the object 200 is stationary, and when the image-capturing apparatus 100 performs tracking leftward, the same captured images as FIGS. 7A and 7B are obtained. Therefore, the movement of the image-capturing apparatus 100 can also be detected in accordance with the same principle as FIGS. 7A and 7B. However, as shown in FIG. 8, it is possible to consider the case where: the image-capturing apparatus 100 and the object 200 move simultaneously; their relative positions at Time Ti−1 and Time Ti are stored; and the captured image ICi−1 and the captured image ICi become identical. In this case, with the method of calculating the difference value as shown in FIGS. 7A and 7B, the movement of the image-capturing apparatus 100 or the movement of the object 200 cannot be detected. Thus, as shown in FIG. 9, the posture sensor 114 is incorporated in the image-capturing apparatus 100, so as to detect the movement of the image-capturing apparatus 100. The method shown in FIGS. 7A and 7B for detecting the movement of the object is an example, and other arbitrary methods can be used in the present invention. However, whatever method may be adopted, the posture sensor 114 can be used effectively as long as the movement of the image-capturing apparatus 100 is independently detected, since allowing such independent detection of the image-capturing apparatus 100 leads to improved accuracy of detecting the movement of the object 200. For the posture sensor 114, an angular velocity sensor, an acceleration sensor or the like is used.

The recording media unit 108 stores, along with time, the captured image IC outputted from the pickup device unit 104 and the zoom factor ZF outputted from the zoom factor setting unit 105. It is possible to recognize the correspondence relationship between the captured image IC and the zoom factor ZF by referring to the time at which they are recorded. When the object movement detecting unit 106 or the image-capturing-apparatus movement detecting unit 107 detects the movement of the object 200 or the image-capturing apparatus 100, a captured image IC captured at 1-power optical zoom is recorded irrespective of the set value for the zoom factor ZF, since the multifocal lens unit 101 is set to 1-power optical zoom.

The framing resetting unit 109 and the framing change unit 110 do not operate in capturing, but operate when the recorded video is reproduced so as to reset the framing. Thus, in capturing, the zoom factor ZF, which is assigned by the zoom factor setting unit 105, passes through the framing change unit 110 to be inputted into the frame area setting unit 111 and the electronic zoom processing unit 112. The operations of the framing resetting unit 109 and the framing change unit 110 shall be described later as operations for reproduction, following the description of the image-capturing operation.

The frame area setting unit 111 sets, according to the zoom factor ZF, a frame area ICF to be clipped out of the captured image IC, which is an output from the pickup device unit 104. The electronic zoom processing unit 112 clips the frame area ICF out of the captured image IC, generates a framing image IDF through electronic zoom by image processing, and displays, to the photographer, the framing image IDF in the framing image display unit 113.

Figure 10:
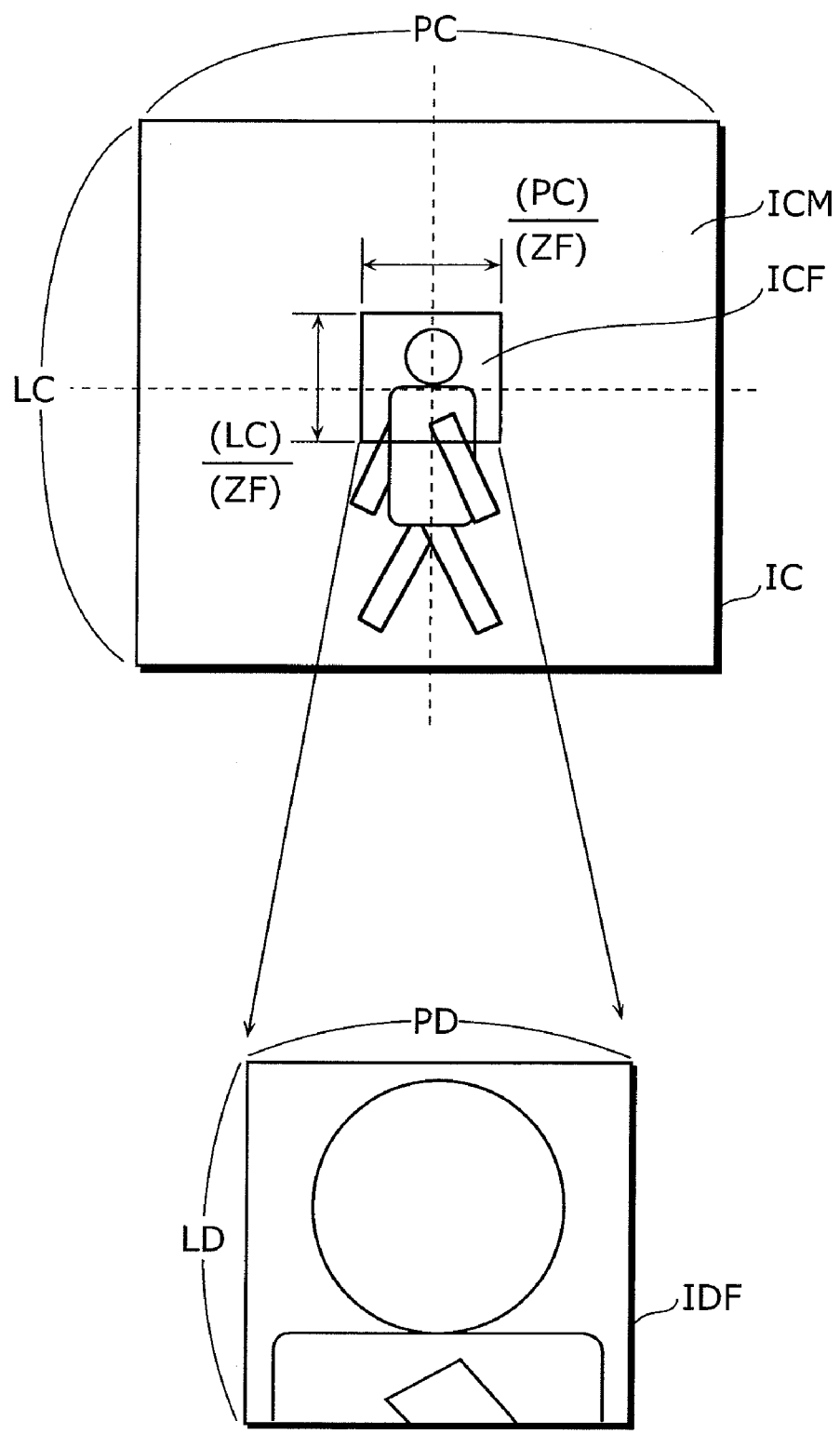
FIG. 10 is a diagram showing details of a captured image IC and a framing image IDF shown in FIG. 5.

FIG. 10 shows details of the captured image IC and the framing image IDF shown in FIG. 5. The captured image IC has the number of pixels PC and the number of lines LC both of which match the number of pixels and the number of lines of the pickup device unit 104. The framing image IDF has the number of pixels PD and the number of lines LD both of which match the number of pixels and the number of lines of the framing image display unit 113. The intersection of the dotted lines represents the position of the optical axis of the multifocal optical lens unit 101, and corresponds to the center of the captured image IC and the center of the framing image IDF. The zoom factor ZF is assumed as 1-power when the multifocal optical zoom unit 101 has the widest angle of view, and therefore, for the frame area ICF to be clipped out by narrowing the angle of view according to the zoom factor ZF, the number of pixels becomes (PC)/(ZF), and the number of lines becomes (LC)/(ZF).

Next, in order to display the frame area ICF in the framing image display unit 113, electronic zoom is performed for converting the number of pixels (PC)/(ZF) into the number of pixels PD, and the number of lines (LC)/(ZF) into the number of lines LD. When the number of pixels PD is larger than the number of pixels (PC)/(ZF), or when the number of lines LD is larger than the number of lines (LC)/(ZF), the image is magnified by electronic zoom. In the present invention, the method for image magnification is arbitrary, and an exemplary method for image magnification is shown in FIGS. 11 and 12.

Figure 11:
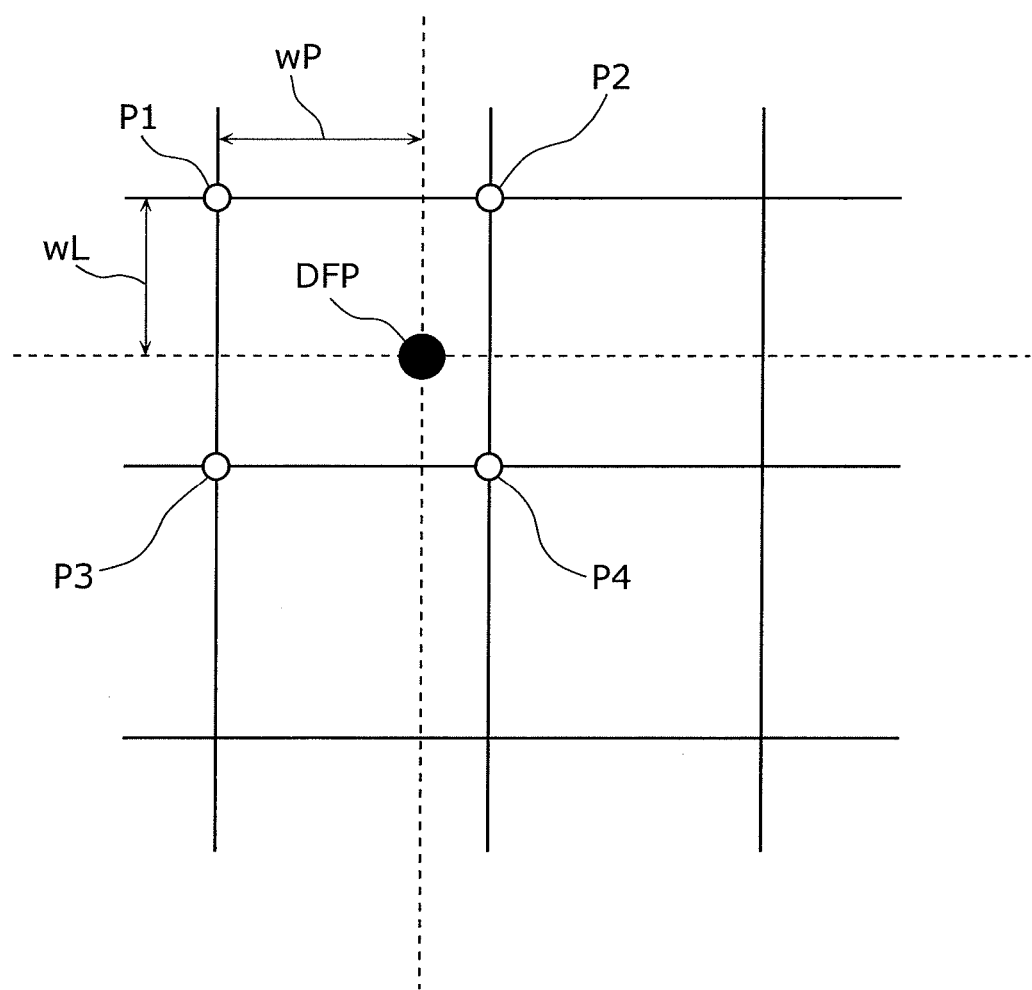
FIG. 11 is a diagram describing a linear interpolation method.
Figure 12:
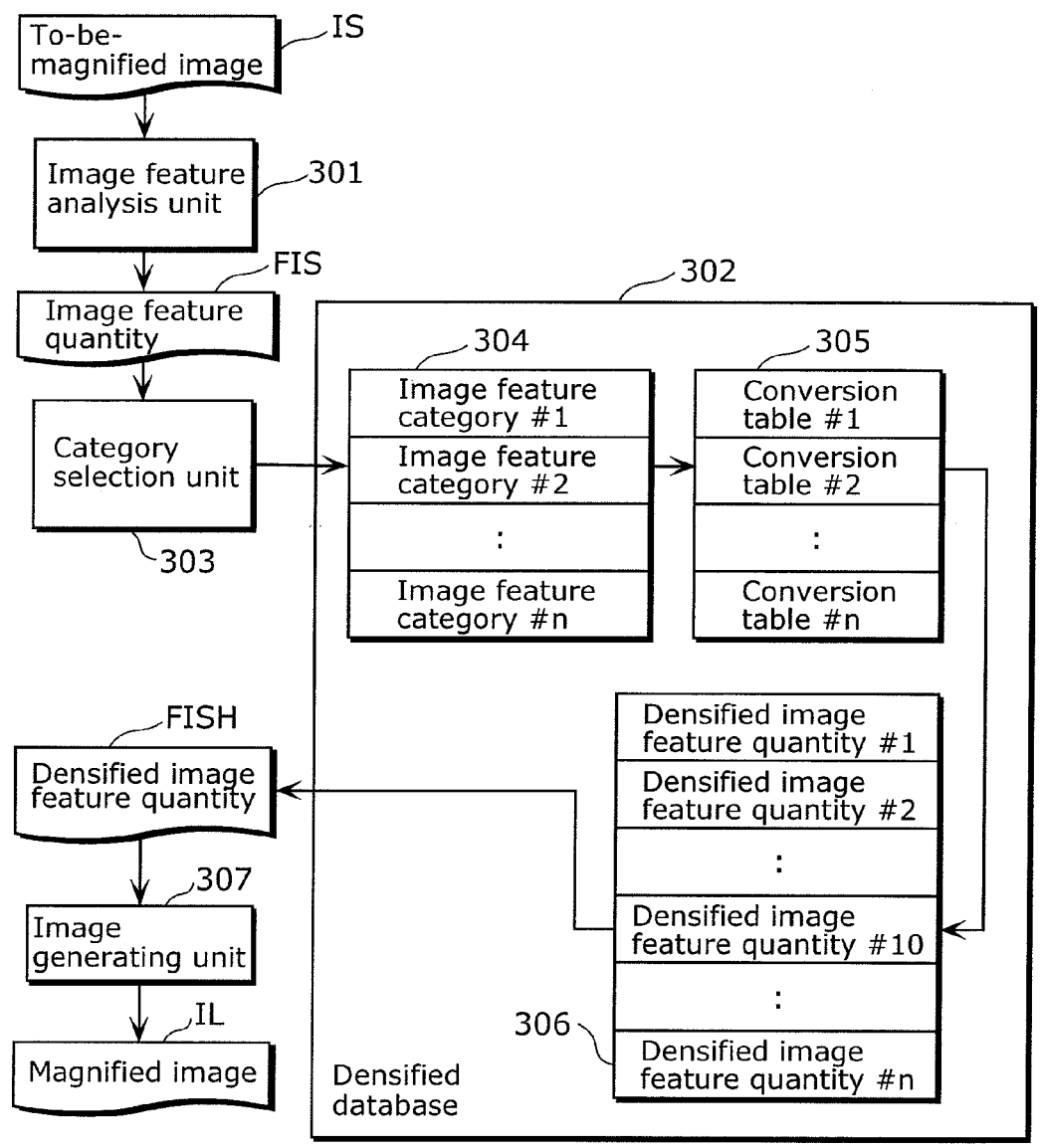
FIG. 12 is a diagram describing a database-reference method for image magnification.

FIG. 11 is a diagram describing a linear interpolation method. The solid lines indicate the pixel positions of the magnified image (corresponding to the frame area ICF in FIG. 10), and the intersection of the solid lines shows a pixel. A pixel P1 has a pixel value S1; a pixel P2 has a pixel value S2; a pixel P3 has a pixel value S3; and a pixel P4 has a pixel value S4. The dotted lines indicate the pixel positions of the magnified image (corresponding to the framing image IDF in FIG. 10), and the pixel value SD of the pixel DFP is calculated by the liner interpolation operation in (Expression 2).

[Expression 2]

$$S_D = S_A + w_L(S_B - S_A)$$

$$S_A = S_1 + w_P(S_2 - S_1)$$

$$S_B = S_3 + w_P(S_4 - S_3)$$ (Expression 2)

FIG. 12 is a diagram describing a database-reference method for image magnification. In this case, the electronic zoom processing unit 112 includes, as shown in FIG. 12: an image feature analysis unit 301, a densification database 302, a category selection unit 303, and an image generating unit 307. In addition, the densification database 302 includes: a feature category database 304, a conversion table database 305, and a densified image feature quantity database 306.

Figure 13:
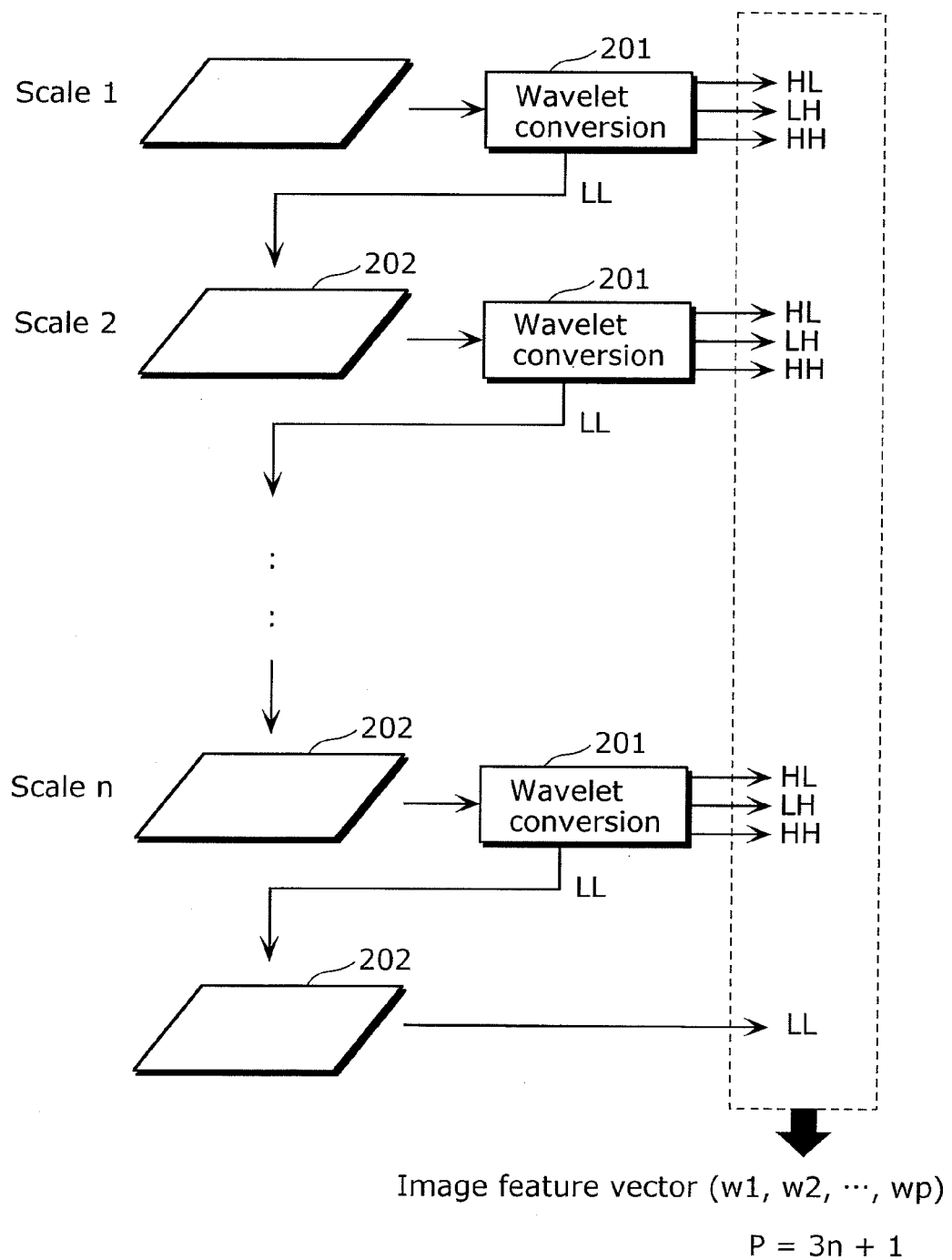
FIG. 13 is a diagram describing a method of representing an image feature quantity FIS in a wavelet transform coefficient.

The to-be-magnified image IS (corresponding to the frame area ICF in FIG. 10) is converted into the image feature quantity FIS in the image feature analysis unit 301. The image feature quantity FIS is a feature quantity which represents image texture (that is a generic term for designs and patterns, which expresses gloss and irregularities). For example, the image feature quantity FIS is expressed, as shown in FIG. 13, in a multidimensional vector that includes wavelet transform coefficients as elements. In other words, wavelet transform outputs HL, LH, HH, and LL are obtained in each of the n times of scaling, and these are bundled with respect to each layer, so as to obtain a (3n+1) dimensional vector. This is used for the image feature quantity FIS. The densification database 302 converts the image feature quantity FIS into a densified image feature quantity FISH having a high spatial density. The densification database 302 holds conversion information of the image feature quantity for densification according to each image feature category. There, the category for the image feature quantity FIS is selected in the category selection unit 303; in the example in FIG. 12, an image feature category #2 is selected. When the image feature quantity is densified by setting the image feature category, for example, according to the type of the material of which the object is made (for example, skin, wood, stone, and fabric), it becomes possible to hold the texture of the material, thereby allowing control of magnified images as high-definition images. The image feature category specified in the category selection unit 303 is a category selected as having the largest similarity with reference to the image feature category database 304; in the example in FIG. 12, an image feature category #2 is selected. When the category number (#2 in this example) is determined by referring to the image feature category database 304, the same category number is selected in the conversion table database 305, and the category number for the densified image feature quantity to be referred to (#10 in this example) is obtained. The densified image feature quantity is selected from the densified image feature quantity database 306 according to the category number of the densified image feature quantity. In this example, a densified image feature quantity #10 is outputted to the image generating unit 307 as the densified image feature quantity FISH. The image generating unit 307 converts the densified image feature quantity into a magnified image IL through inverse transform to the processing performed by the image feature analysis unit 301. In the case where wavelet transform is used for the image feature analysis unit 301, wavelet inverse transform is applied.

As described above, when the object movement detecting unit 106 detects the movement of the object 200, or when the imaging-capturing-apparatus movement detecting unit 107 detects the movement of the image-capturing apparatus 100, or at least one of the movement of the object 200 and the movement of the image-capturing apparatus 100 is detected, the angle of view is set to the widest, assuming a high possibility of missing the object 200 in capturing, and the captured image IC, including the outer-frame area ICF, is stored in the recording media unit 108. Conversely, when the object 200 and the image-capturing apparatus 100 are both stationary, only the frame area ICF is stored, as the captured image IC, in the recording media unit 108, assuming that there is a low possibility of the object 200 being missed in capturing. According to such an operational principle, while keeping the possibility of missing the object in capturing to a minimum, it is possible to maximally reduce the recording volume to be recorded on the recording media unit 108.

A description shall be given of the operation when the photographer captures an image of the object 200, using the image-capturing apparatus 100 configured as above.

Figure 14:
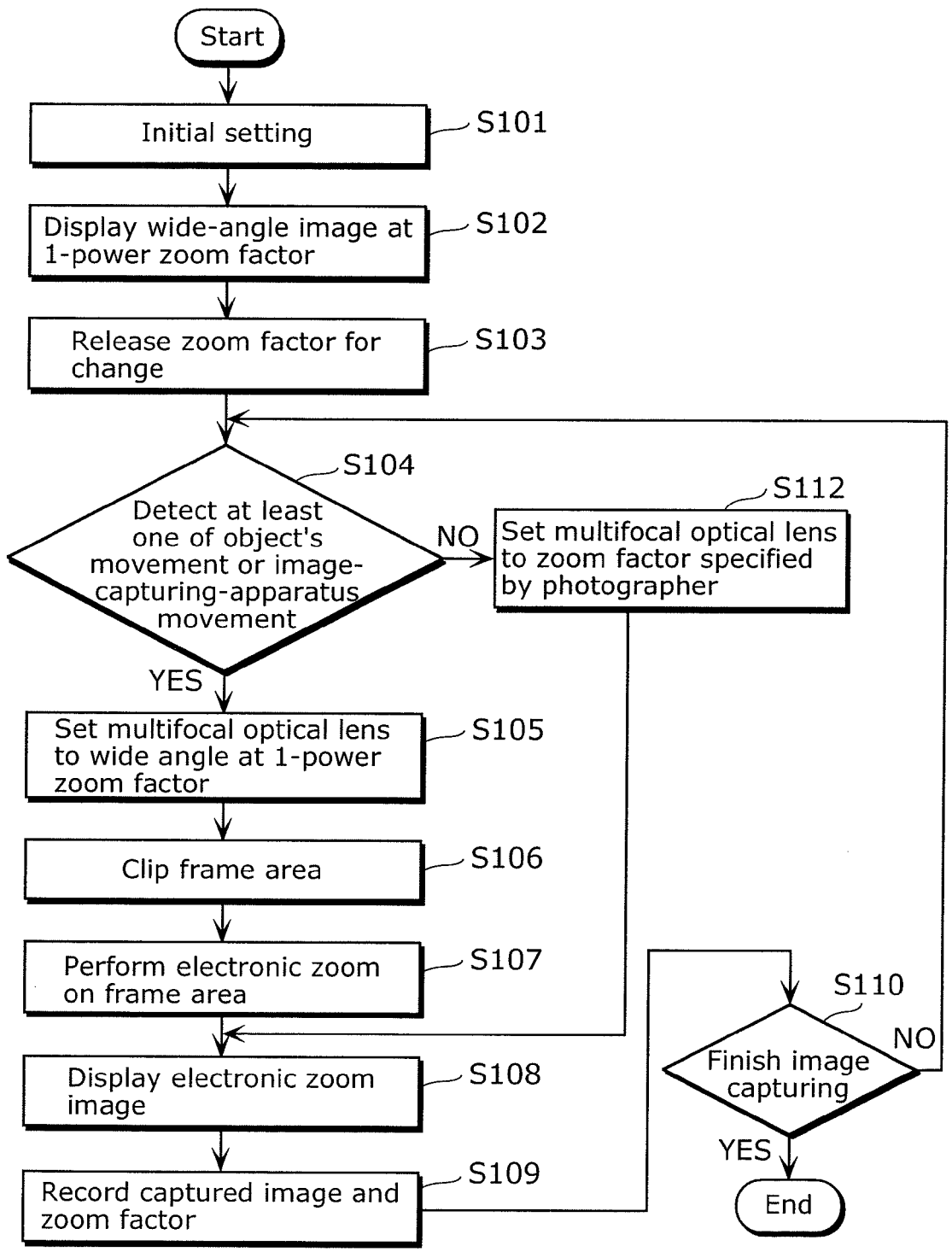
FIG. 14 is a flowchart describing the operation of an image-capturing apparatus.

FIG. 14 is a flowchart describing the operation of the image-capturing apparatus 100.

When the image-capturing apparatus 100 is activated, the focal length control unit 102 sets, for initial setting (S101), the focal length of the multifocal optical lens unit 101 to the minimum, and resets the zoom factor ZF to 1. Since the frame area setting unit 111 and the electronic zoom processing unit 112 operate with the zoom factor ZF being 1, an image of a 1-power zoom factor having the widest angle of view is displayed in the framing image display unit 113 (S102). The zoom factor setting unit 105 is released to the photographer (S103), and the photographer can change the zoom factor ZF at an arbitrary time. When the photographer presses the recording button, the object movement detecting unit 106 starts monitoring the movement of the object, while the image-capturing-apparatus movement detecting unit 107 starts monitoring the movement of the image-capturing apparatus (S104). When at least one of the movement of the object and the movement of the image-capturing apparatus is detected (YES in S104), the focal length calculating unit 103 calculates the focal length so that the zoom factor ZF becomes 1, and the focal length control unit 102 sets the multifocal optical lens unit 101 to wide-angle corresponding to the zoom factor 1 (S105). From a wide-angle image of a 1-power zoom factor, the frame area ICF corresponding to the zoom factor ZF is set, and this frame area ICF is clipped by the electronic zoom processing unit 112 (S106). Then, the electronic zoom processing unit 112 magnifies or reduces the frame area ICF so that the frame area ICF matches the image size displayed in the framing image display unit 113 (S107). An electronic zoom image is displayed in the framing image display unit 113 (S108), and the captured image IC and the zoom factor ZF are stored in the recording media unit 108 (S109). When capturing is finished (YES in S110), the operation is terminated. When the capturing continues (NO in S110), the operation goes back to the step of detecting at least one of the movement of the object and the movement of the image-capturing apparatus (S104). On the other hand, when neither the movement of the object nor the movement of the image-capturing apparatus is detected (NO in S104), the multifocal optical lens unit 101 is set to the zoom factor ZF set by the photographer (S112). The captured image IC, which is the output of the pickup device unit 104, is displayed in the framing image display unit 113 (S108).

The above has been the description of the operation at the time of capturing. Next, in addition to this, the framing-resetting operation at the time of reproduction shall be described.

Figure 15A:
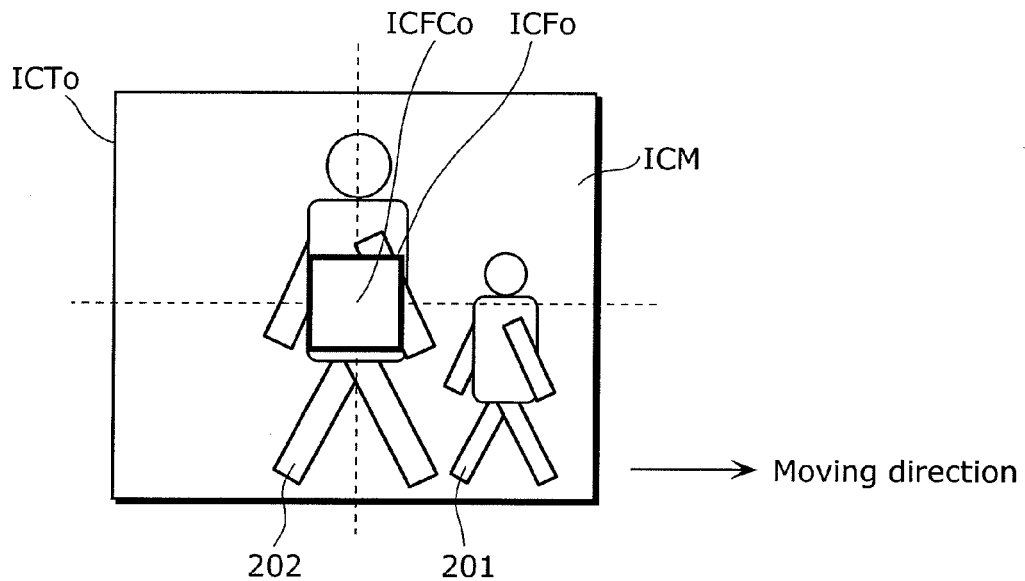
FIG. 15A is a diagram describing a method for resetting the framing.
Figure 15B:
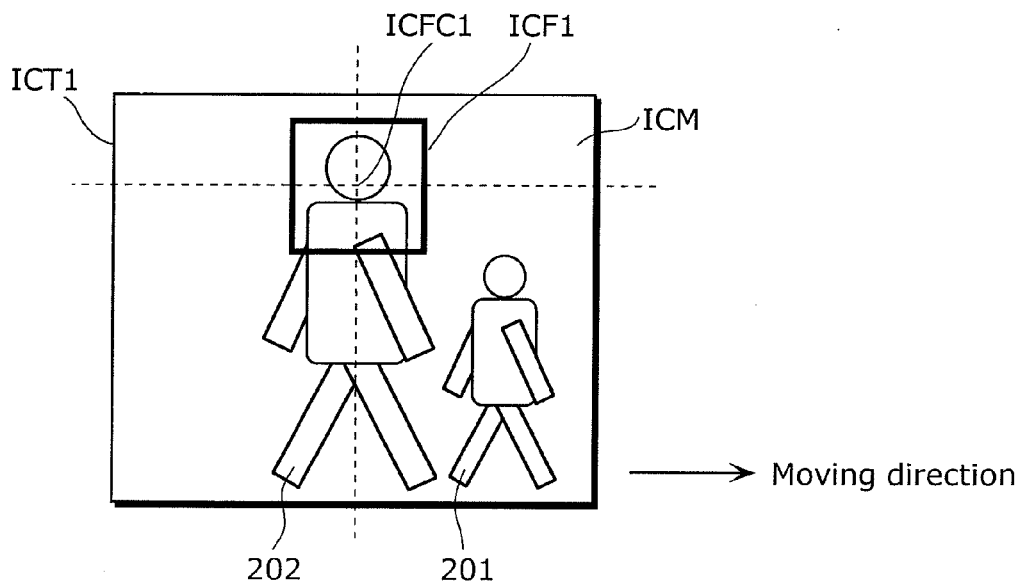
FIG. 15B is a diagram describing a method for resetting the framing.

The framing resetting unit 109 is a unit which modifies, after capturing, the framing having been set at the time of capturing, and can change the position of the frame area ICF and the zoom factor ZF. FIGS. 15A and 15B are diagrams describing a method for resetting the framing. The image ICTo is a captured image stored in the recording media unit 108 at the time of capturing, and includes an outer-frame area ICM. It is assumed that the capturing intention is to capture the upper body of a person moving rightward. Before the captured image ICTo is recorded, the framing is for capturing the upper body of the object 201, but at the point in time when the captured image ICTo is captured, the object 202 is found taller than the object 201 and becomes frame-out. Therefore, it is assumed that the framing is intended for reset, to be like the captured image ICT1. In other words, the center position ICFCo of the frame area ICFo is shifted to the center position ICFC1 of the frame area ICF1, with the angle of view being made wider (the zoom factor being made smaller).

For the method for specifying the center position of the frame area and the zoom factor, as is the case with capturing, the photographer reproduces the captured image stored in the recording media unit 108, and moves, while confirming the framing in the framing image display unit 113, the image-capturing apparatus 100 into a direction intended for modification. At the same time, the zoom setting unit 105 is adjusted. The movement of the image-capturing apparatus 100 is detected using the posture sensor 114 (FIG. 9), so as to read the change in the optical-axis position in the captured image IC. When the framing is reset, time allowance is given to confirmation of the framing and the operation by reducing the reproduction speed (for example, ⅕ second). In addition, the photographer may change the reproduction speed. The center position ICFC1 and the zoom factor ZF of the frame area that have been changed are stored in the recording media unit 108 through the framing change unit 110. At this time, the photographer can select an "overwrite mode" in which only new changed data is saved with previous data being deleted, or a "copy mode" in which previous data is maintained and new changed data is separately recorded. In addition, it is also possible to use a "copy overwrite mode" in which temporary modification is made in the copy mode, and after reproducing the modified result and confirming the modified result in the framing image display unit 113, the overwrite mode is performed. Furthermore, the photographer can instruct, after creating the changed data, whether to delete or retain the data of the outer-frame area ICM. Note that in order to save the recording capacity of the recording medium, it is preferable to select the overwrite mode and delete the outer-frame area both in the previous data and the changed data. Conversely, in the case where the possibility remains that the resetting of the framing is repeated, it is preferable to retain the outer-frame area both in the previous data and the changed data. In the case of repeating the resetting of the framing, the photographer can select whether to perform the resetting on the previous data or to perform an additional change on the changed data. As described above, when the framing is reset according to the same operational method as in capturing, the framing record at the time of capturing (for example, that the image-capturing apparatus should have been cocked up) can be referred to, and this facilitates the resetting operation and produces an advantageous effect of allowing modification, at a time, to a video made up of plural frame images.

The size of the frame area ICFo depends on the zoom factor ZF, and the number of pixels included in the frame area ICFo is $1/(ZF)^2$ of the entire image ICTo. For example, the number of pixels included in the frame area ICFo is ¼ when the zoom factor ZF is 2-power, and is ¹⁄₁₆ when the zoom factor ZF is 4-power. The number of pixels included in the outer-frame area ICM is obtained by deducting the number of pixels of the frame area ICFo from the number of pixels of the entire image ICTo. Therefore, the number of pixels is ¾ when the zoom factor ZF is 2-power, and is 15/16 when the zoom factor ZF is 4-power. Relatively, the outer-frame area ICM having a lower possibility of being used includes a larger number of pixels than the frame area ICF having a higher possibility of being used. Therefore, considering the recording capacity of the recording media unit 108 with a certain value (for example, 30 GB), it can be easily understand that deleting the outer-frame area is effective for extending the recording time. For example, assuming that the image size in the pickup device unit 104 is 2560 pixels×1920 lines, and that the recording capacity of the recording media unit 108 is 30 GB, in the case of an RGB 24-bit image, the upper limit of the recording capacity is reached in approximately 86 seconds. Supposing a case where the image size in the framing image display unit 113 is 640 pixels×480 lines, the image size in the frame area ICF is ¼, both in the number of pixels and number of lines, as compared to the captured image IC, and the outer-frame is 15/16. Therefore, in one of the cases where the object 200 and the image-capturing apparatus 100 are both stationary and where the outer-frame area is deleted after capturing, the volume to be recorded is reduced to 15/16, so that the recording time is extended up to approximately 1080 seconds (approximately 18 minutes) in the case where the upper limit for recording is 30 GB.

In addition, by performing electronic zoom by image processing, as illustrated in FIGS. 11 and 12, in the electronic zoom processing unit 112, it is possible to reduce the number of pixels and the number of lines in the pickup device unit 104. For example, when the pickup device unit 104 is set to have 1280 pixels×960 lines, and when 2-power magnification is performed in the electronic zoom processing unit 112, a frame area ICF equivalent of 2560 pixels×1920 lines can be obtained. Thus, since both the number of pixels and number of lines for the pickup device unit 104 are reduced to ½, the recording time for the recording media unit 108 becomes longer by four times: for example, assuming that the recording capacity of the recording media unit 108 is 30 GB, the recording time becomes approximately 334 seconds (5 minutes and 34 seconds), and is extended to 72 minutes in the case where the outer-frame area ICM is not saved.

Note that in the description of FIG. 5, the optical zoom is set to 1-power when at least one of the movement of the object and the movement of the image-capturing apparatus is detected, but the present invention is not to restrict the optical zoom factor, which may also be 1.5-power, for example. The essence of the operation is to switch to wide-angle capturing when at least one of the movement of the object and the movement of the image-capturing apparatus is detected, and this allows arbitrary setting of the value as long as the zoom factor is adoptable for the prevention of missing the object in capturing.

As thus far described, by monitoring the movements of the object and the photographer, and selectively using optical zoom and electronic zoom, it is possible to provide an image-capturing apparatus which keeps the object-missing capturing to a minimum, and which also allows recording for an extended period of time. In addition, since the framing is reset by moving the image-capturing apparatus and changing the zoom factor in the same manner as in capturing, it is not necessary to learn another operational method, and the video can be modified smoothly.

Second Embodiment

In the present embodiment, an image-capturing apparatus shall be described which stores a captured image on a recording medium by switching a compression rate for an image data between a frame area and an outer-frame area.

Figure 16:
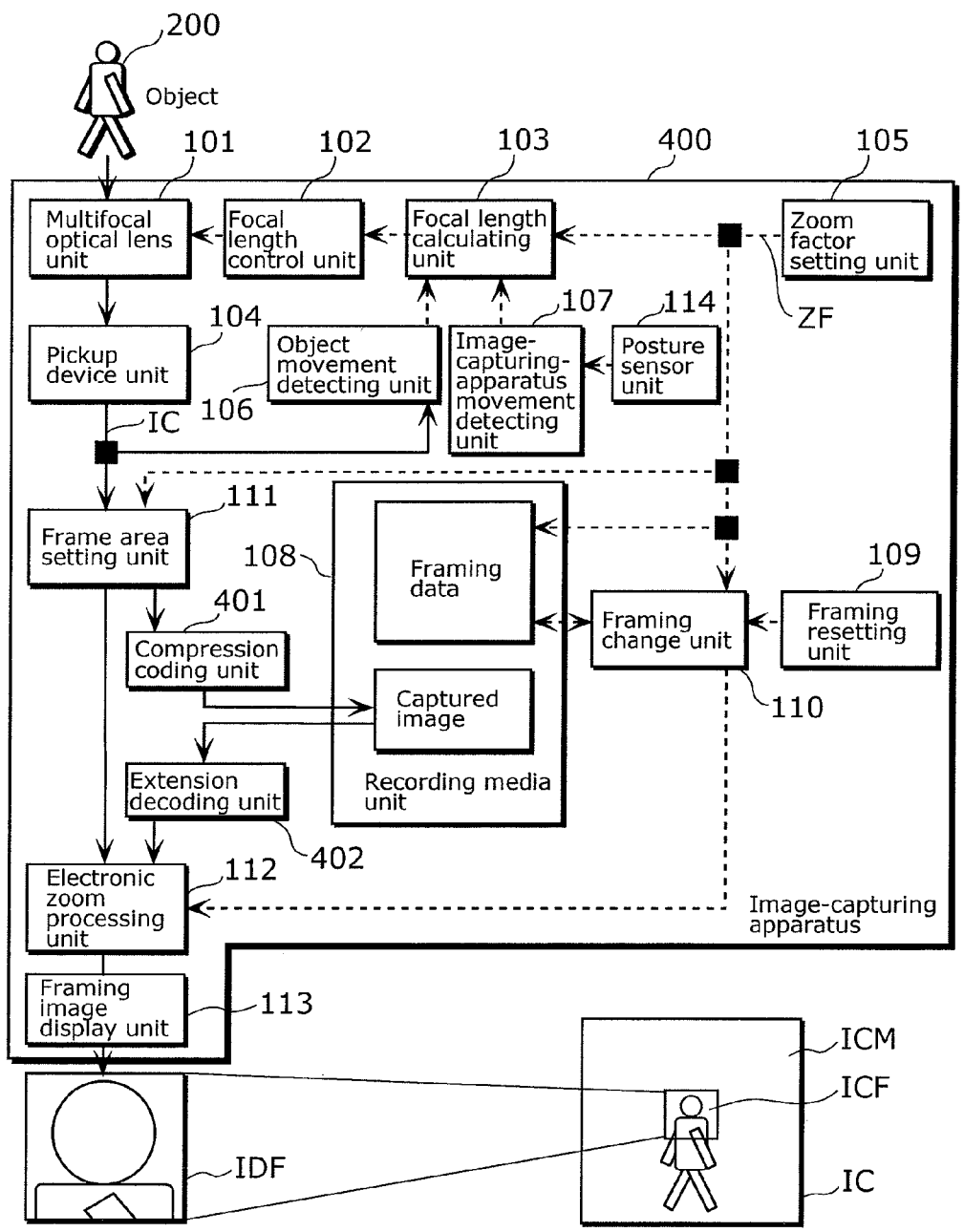
FIG. 16 is a block diagram showing the configuration of an image-capturing apparatus according to a second embodiment of the present embodiment.

FIG. 16 is a block diagram showing the configuration of an image-capturing apparatus according to a second embodiment of the present invention. Note that the same numerical references are given to constituent elements that are the same as those in FIG. 5, and their detailed descriptions shall be omitted.

An image-capturing apparatus 400 is an apparatus for capturing an image of the object 200, and includes: a multifocal optical lens unit 101, a focal length control unit 102, a focal length calculating unit 103, a pickup device unit 104, a zoom factor setting unit 105, an object movement detecting unit 106, an image-capturing-apparatus movement detecting unit 107, a recording media unit 108, a framing resetting unit 109, a framing change unit 110, a frame area setting unit 111, an electronic zoom processing unit 112, a framing image display unit 113, a posture sensor 114, a compression coding unit 401, and an extension decoding unit 115.

The compression coding unit 401 performs, at different compression rates, image compression processing on the frame area ICF and the outer-frame area ICM that have been set in the frame area setting unit 111, and outputs the processed data to the recording media unit 108. Relatively, the outer-frame ICF has a higher possibility of being used for image display, whereas the outer-frame area has a lower possibility of being used for image display; therefore, in order to reduce recording volume, a higher compression rate is applied to the outer-frame area so as to extend the recording time. Although a higher compression rate causes deterioration in image quality, it is possible to prevent the object-missing capturing by providing the outer-frame area. For example, assuming that the image size in the pickup device unit 104 is 2560 pixels×1920 lines, and that the recording capacity of the recording media unit 108 is 30 GB, in the case of an RGB 24-bit image, the upper limit of the recording capacity is reached in approximately 86 seconds. Supposing a case where the image size in the framing image display unit 113 is 640 pixels×480 lines, the image size in the frame area ICF is ¼, both in the number of pixels and number of lines, as compared to the captured image IC, and the outer-frame ICM accounts for 15/16. Thus, in the case where the data volume for the outer-frame area ICM is compressed to ½ and where the data volume for the frame area ICF is compressed to ¾, the recording volume per frame is approximately 7.6 MB, and assuming that the recording capacity of the recording media unit 108 is 30 GB, the recording time is extended, by approximately 1.5 times, to approximately 132 seconds (2 minutes and 12 seconds).

The extension decoding unit 402 decodes the compression-coded captured image IC, and outputs the extension-decoded captured image IC to the electronic zoom processing unit 112.

As described above, it is possible to provide an image-capturing apparatus which can extend recording time, by storing the captured image on a recording medium, with the compression rate being switched between the frame area and the outer-frame area. Note that the frame area and the outer-frame area may be compression-coded at the same compression rate; however, by switching the compression rate as described above, the captured image can be efficiently recorded on the recording medium.

Third Embodiment

In the present embodiment, an image-capturing apparatus shall be described which controls at least one of the size and the compression rate of the frame area according to the degree of the movement of an object and the movement of an image-capturing apparatus.

Figure 17:
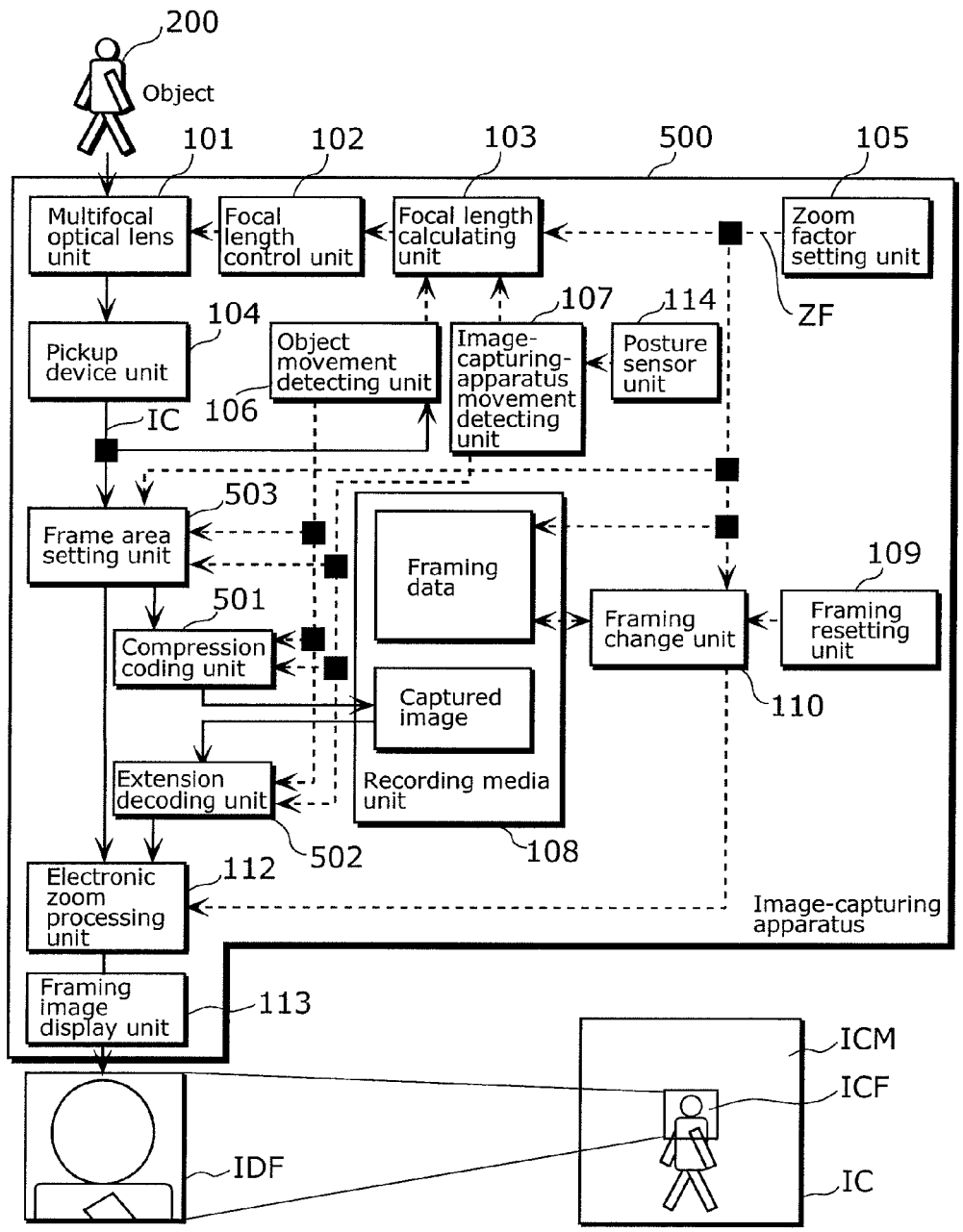
FIG. 17 is a block diagram showing the configuration of an image-capturing apparatus according to a third embodiment of the present invention.

FIG. 17 is a block diagram showing the configuration of an image-capturing apparatus according to a third embodiment of the present invention. Note that the same numerical references are given to constituent elements that are the same as those in FIG. 16, and their detailed descriptions shall be omitted.

An image-capturing apparatus 500 is an apparatus for capturing an image of an object 200, and includes: a multifocal optical lens unit 101, a focal length control unit 102, a focal length calculating unit 103, a pickup device unit 104, a zoom factor setting unit 105, an object movement detecting unit 106, an image-capturing-apparatus movement detecting unit 107, a recording media unit 108, a framing resetting unit 109, a framing change unit 110, a frame area setting unit 503, an electronic zoom processing unit 112, a framing image display unit 113, a posture sensor unit 114, a compression coding unit 501, and an extension decoding unit 502.

The object movement detecting unit 106 outputs the result of the object movement detection to the focal length calculating unit 103, and also outputs the result of the object movement detection to the frame area setting unit 503, the compression coding unit 501, and the extension decoding unit 502. In the output to the frame area setting unit 503, the compression coding unit 501, and the extension decoding unit 502, the object movement detecting unit 106 outputs not only the binary information indicating whether or not there is any movement but also the degree of movement of the object. The degree of movement is considered in the two following points: the proportion, in the captured image IC, of the number of pixels in which the movement of the object has been detected; and in terms of time change, the degree to which a group of such pixels in which the movement of the object has been detected has moved.

As shown in FIGS. 7A and 7B, the movement of the object is obtained by calculating, for each pixel, pixel-value difference between two images that are temporally preceding and succeeding to each other (in FIGS. 7A and 7B, Image ICi−1 at Time Ti−1 and Image ICi at Time Ti), and it is judged that movement has occurred in a pixel having a difference value. Therefore, it is judged that the degree of movement of the object is larger when the shaded area of an image ICOPT, which represents the distribution of difference values, is larger.

FIGS. 18A and 18B show three captured images ICi−1, ICi, and ICi+1 that are consecutive at Time Ti−1, Time Ti, and Time Ti+1. The difference between Time Ti−1 and Time Ti is Image ICOPT1, and the difference between Time Ti and Time Ti+1 is Image ICOPT2. The centroid of the pixel having movement, shown shaded in Image ICOPT1, is a point CP1, and the centroid of the pixel having movement, shown shaded in Image ICOPT2, is a point CP2, indicating that a group of pixels in which the movement of the object has been detected is moving. That is, a vertical dotted line CV1 passing through the point CP1 and a vertical dotted line CV2 passing through the point CP2 are in different positions. Note that a horizontal dotted line CH1 passing through the point CP1 and a horizontal dotted line CH2 passing through the point CP2 are in the same position since the object 200 is moving in parallel. From the incongruity of the dotted line CV1 and the dotted line CV2, it is possible to understand that the movement of the object is continuous from Time Ti−1 to Time Ti+1, and it is judged that the degree of movement of the object is large. The larger the degree of movement of the object is, the higher the possibility of being unable to set the framing according to the capturing intention becomes; therefore, the accuracy of preventing the object-missing capturing is increased by taking the frame area ICF smaller and the outer-frame area ICM larger. Temporally-continuous monitoring is performed on the centroid position of the group of pixels in which the movement of the object has been detected, and the degree of movement of the object is judged as larger when the movement of the centroid position continues for a longer period of time.

As described above, the description has been given of the method for changing the size of the frame area ICF according to the movement of the object, with the compression rate being fixed. However, the compression rate for image compression may also be controlled in the same manner, with the size of the frame area ICF being fixed. In other words, since there is a high possibility of resetting the framing using the outer-frame area ICM when the inputted degree of movement is large, the compression coding unit 501 maintains the high level of image quality by lowering the compression rate for image compression to be performed on the outer-frame area ICM.

In addition, it is possible to control, at the same time, the size of the frame area ICF according to the degree of movement of the object and the compression rate for the outer-frame area ICM. At this time, the smaller the size of the frame area ICF becomes, the larger the magnification rate for image magnification to be performed by the electronic zoom processing unit 112 becomes. Thus, when the size of the frame area ICF becomes smaller, the compression rate for image compression to be performed on the frame area ICF is made lower, so as to keep the image quality level.

In the above description, the operation in FIG. 17 has been described focusing on the movement of the object, but the movement of the object can be replaced by the movement of the image-capturing apparatus. In addition, the degree of movement may also be obtained in the case where at least one of the movement of the object and the movement of the image-capturing apparatus occurs.

As thus far described, it is possible to provide an image-capturing apparatus, which controls at least one of the frame area size or the compression rate, according to the degrees of movement of the object and movement of the image-capturing apparatus, thereby keeping the object-missing capturing to a minimum and extending the recording time.

Fourth Embodiment

In the present embodiment, an image-capturing apparatus shall be described which manages the frame area and the outer-frame area separately on a recording medium, and overwrites the storage area for the outer-frame area when the remaining recording capacity runs out.

Figure 19:
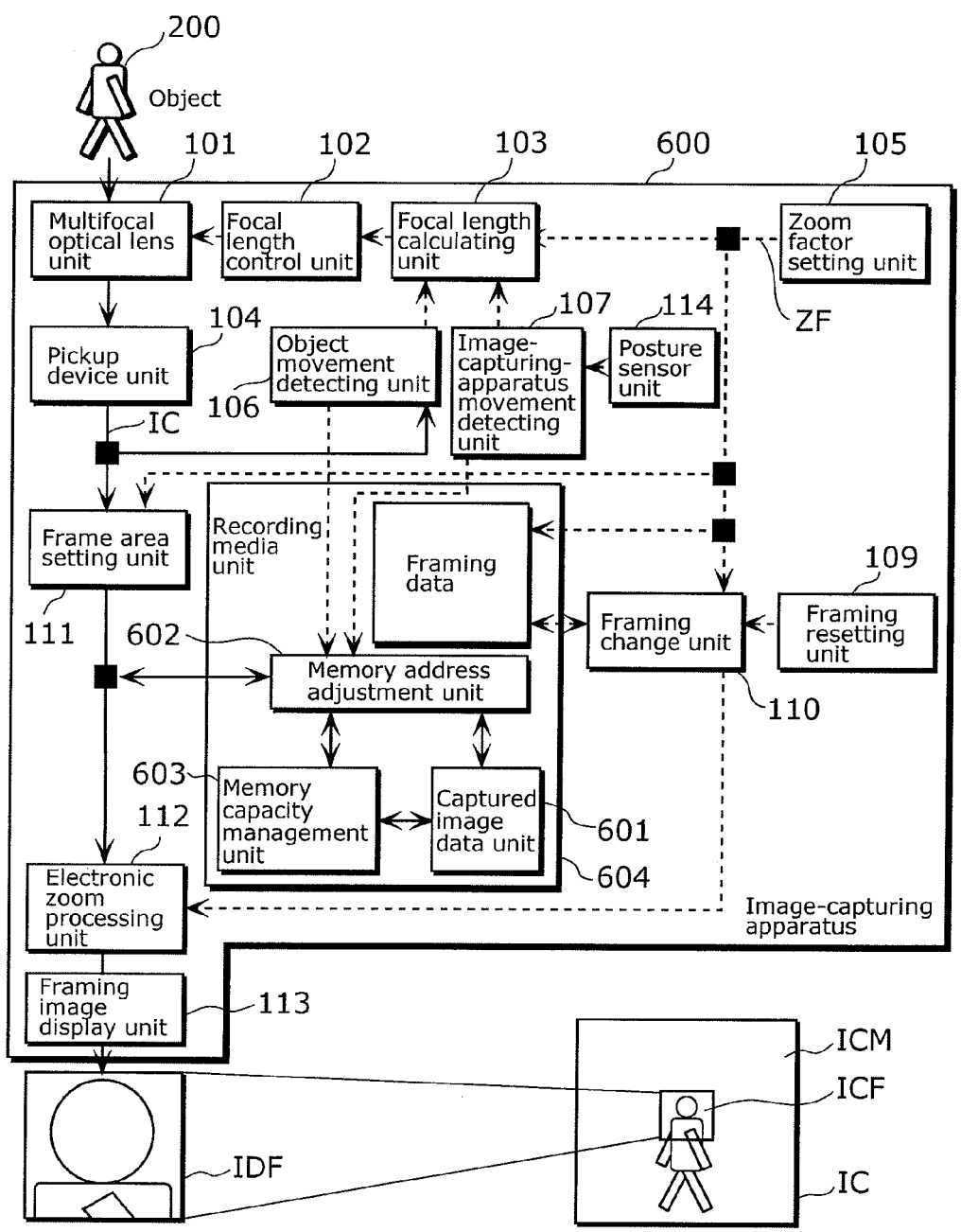
FIG. 19 is a block diagram showing the configuration of an image-capturing apparatus according to a fourth embodiment of the present invention.

FIG. 19 is a block diagram showing the configuration of an image-capturing apparatus according to a fourth embodiment of the present invention. Note that the same numerical references are given to constituent elements that are the same as those in FIG. 5, and their detailed descriptions shall be omitted.

An image-capturing apparatus 600 is an apparatus for capturing an image of the object 200, and includes: a multifocal optical lens unit 101, a focal length control unit 102, a focal length calculating unit 103, a pickup device unit 104, a zoom factor setting unit 105, an object movement detecting unit 106, an image-capturing-apparatus movement detecting unit 107, a recording media unit 604, a framing resetting unit 109, a framing change unit 110, a frame area setting unit 111, an electronic zoom processing unit 112, a framing image display unit 113, and a posture sensor 114, a captured image data unit 601, a memory address adjustment unit 602, and a memory capacity management unit 603.

As shown in FIG. 20, the captured image data unit 601 includes, separately, a storage area for the frame area ICF and a storage area for the outer-frame area ICM, and identifies these areas using memory addresses. In this example, memory addresses 0000 to 1FFF are used for the frame area, and memory addresses from 2000 to FFFF are used for the outer-frame area. The memory address adjustment unit 602 is in charge of assigning the memory addresses according to the frame area ICF and the outer-frame area ICF that are given by the frame area setting unit 104. The memory capacity management 603 monitors the recording capacity of the recording media unit 108, and, in the case where the remaining capacity runs out, gives an instruction to the memory address adjustment unit 602, and overwrites, with the frame area ICF, the memory-address space for the outer-frame area ICM. With this operation, it becomes possible to extend the recording time for the recording area having a relatively higher possibility of being used, and extend the image recording time.

In addition, the degrees of movement from the object movement detecting unit 106 and the image-capturing-apparatus movement detecting unit 107 are recorded in the captured image data unit via the memory address adjustment unit 602. There, as shown in FIG. 20, every outer-frame area ICM has the degree of movement. When the remaining recording capacity runs out, and when the frame area is overwritten to the memory space of the outer-frame area ICM, overwriting is performed, starting from the data having a smaller degree of movement. Through such operation, it is possible to overwrite, starting from the outer-frame area at a point where the movement is the smallest and the possibility of being used is the lowest, thereby keeping the object-missing capturing to a minimum and extending the recording time.

As described above, it is possible to provide an image-capturing apparatus which manages the frame area and the outer-frame area separately on a recording medium, and overwrites the outer-frame area when the remaining recording capacity runs out, thereby keeping the object-missing capturing to a minimum and extending the recording time.

Fifth Embodiment

In the present embodiment, an image-capturing apparatus shall be described which captures, in the case where the object intended for capturing by a photographer is present outside the angle of view, an object in a shorter time in the camera work of the photographer for capturing the object within the angle of view, by moving the framing area in the moving direction of the image-capturing apparatus, which is foreseen by the image-capturing apparatus from the movement of the posture sensor.

Figure 21:
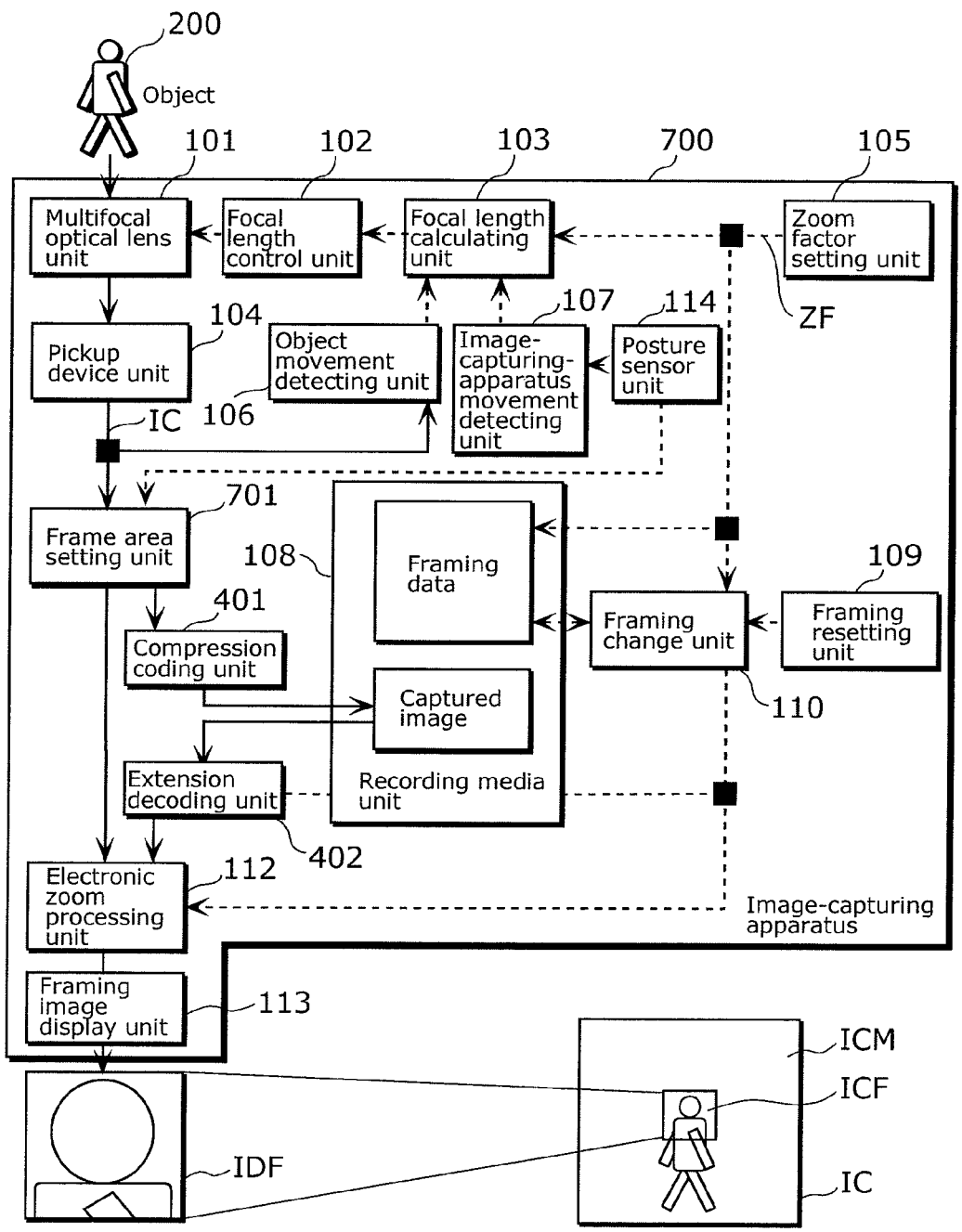
FIG. 21 is a block diagram showing a configuration of an image-capturing apparatus according to a fifth embodiment of the present invention.

FIG. 21 is a block diagram showing the configuration of an image-capturing apparatus according to a fifth embodiment of the present invention. Note that the same numerical references are given to constituent elements that are the same as those in FIG. 5, and their detailed descriptions shall be omitted.

An image-capturing apparatus 700 is an apparatus for capturing an image of the object 200, and includes: a multifocal optical lens unit 101, a focal length control unit 102, a focal length calculating unit 103, a pickup device unit 104, a zoom factor setting unit 105, an object movement detecting unit 106, an image-capturing-apparatus movement detecting unit 107, a recording media unit 108, a framing resetting unit 109, a framing change unit 110, a frame area setting unit 701, a compression coding unit 401, an extension decoding unit 402, an electronic zoom processing unit 112, a framing image display unit 113, and a posture sensor 114.

Figure 22:
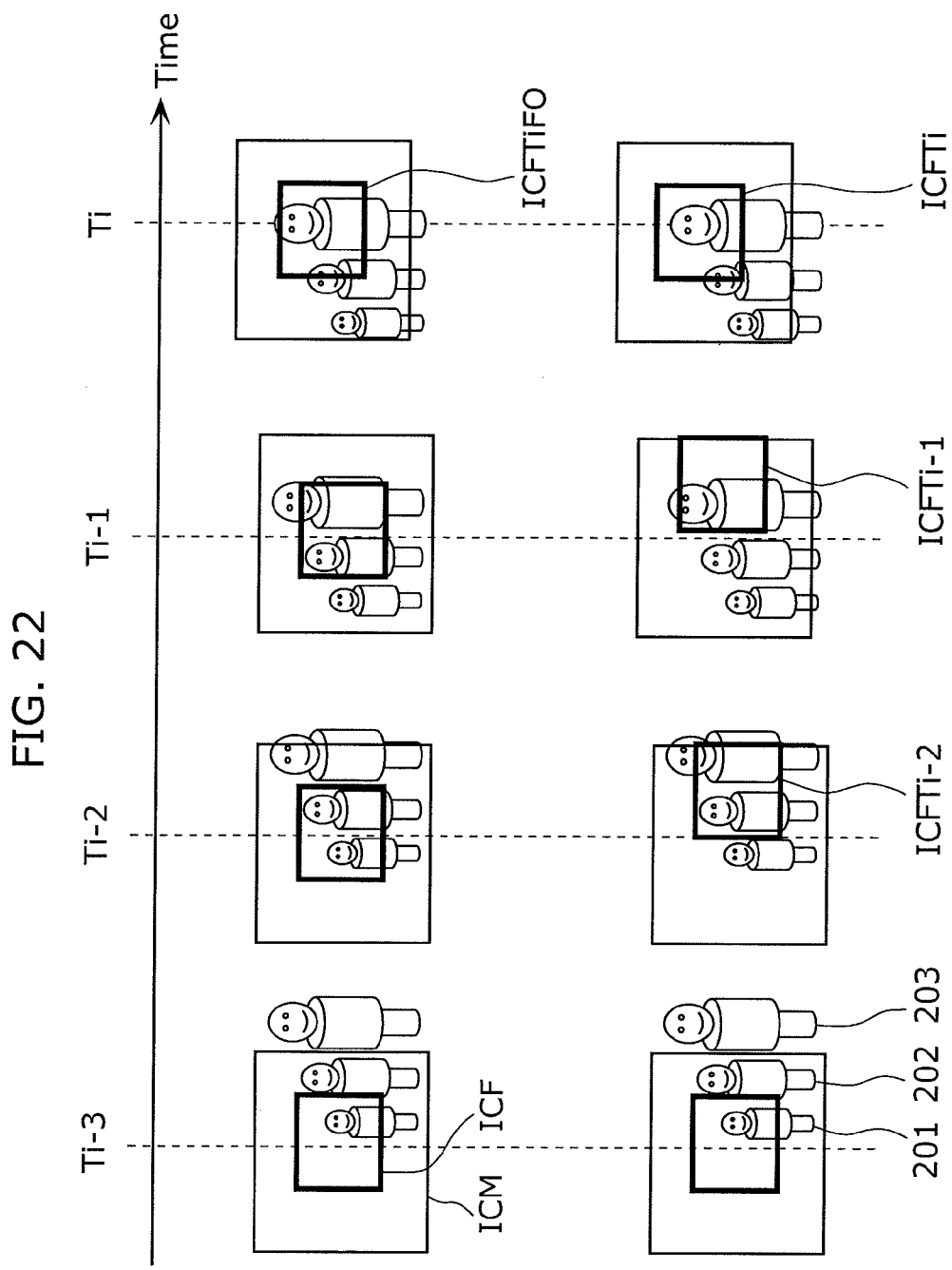
FIG. 22 is a diagram describing a method of foreseeing, with an example of panning the image-capturing apparatus rightward.

The posture sensor unit 114 outputs posture information regarding the image-capturing apparatus 700 to the frame area setting unit 701. The frame area setting unit 701 performs temporal monitoring of the posture information, and when certain regularity is detected in the movement of the image-capturing apparatus 700 (for example, rightward panning continuing for 2 seconds), the frame area setting unit 701, foreseeing that the image-capturing apparatus 700 will continue the same movement, moves the frame area in the moving direction of the image-capturing apparatus (for example, rightward panning) within the captured image IC, so as to capture the object faster than the movement of the image-capturing apparatus. For example, FIG. 22 is an example of panning the image-capturing apparatus 700 rightward. The objects are Person 201, Person 202, and Person 203, with the square of thin solid lines showing the outer-frame area ICM and the square of thick solid lines showing the frame area ICF. The photographer sets the zoom factor ZF for framing the frame area ICF, and the electronic zoom processing unit 112 displays the frame area ICF in the framing image display unit 113 by performing electronic zoom on the frame area ICF. The upper portion of FIG. 22 is a conventional example, in which the center of the frame area ICF coincides with the optical axis. The lower portion is an example, in which the frame area ICF is foreseen. It is assumed that a continuous rightward panning is detected by the monitoring of cumulative posture information up to Time Ti−3 (for example, rightward panning having continued for 2 seconds). There, at Time Ti−2, the frame area ICFTi−2 has moved rightward. At this point in time, the photographer notices that the face of the object 203 is going to become frame-out, and therefore tilts the image-capturing apparatus 700 upward at Time Ti−1, to capture the whole face of the object 203 within the frame area ICF at Time Ti. Since the photographer has confirmed, through the framing image display unit 113, that the whole face of the object 203 is captured, there is no need for moving the image-capturing apparatus 700; the rightward panning for the image-capturing apparatus 700 stops at Time Ti, and the foreseeing of the frame area ICF is stopped at the same time. There, the center of the frame area ICTi returns to the optical axis. On the other hand, in the upper portion in which the frame area ICF is not foreseen, the frame-out of the object 203 is noticed at Time Ti−1; the image-capturing apparatus 700 is in the middle of tilting at Time Ti; and the face of the object 203 is not fully captured in the frame area ICFTiFO. In other words, in the upper portion, the face of the target object 203 is followed only through the movement of the image-capturing apparatus 700, but the follow is not completed at Time Ti, whereas, in the lower portion, the face of the target object 203 is captured faster by foreseeing the frame area in addition to the movement of the image-capturing apparatus 700. Thus, in addition to the movement of the image-capturing apparatus, by moving the frame area in the moving direction of the image-capturing apparatus within the captured image IC, the object can be captured in a shorter period of time, thereby keeping the object-missing capturing to a minimum.

In addition to the movement as described above, the compression coding unit 401 performs compression coding on the frame area ICF at a low compression rate, and performs compression coding on the outer-frame ICM at a high compression rate. The fact that the image-capturing apparatus 700 is moving means that the object important for the photographer is present ahead in the moving direction, and the capturing intention is to capture the object within the frame area;

therefore, a lower compression rate, which causes smaller deterioration to image quality, is used for the frame area that is important in terms of the capturing intention, whereas a higher compression rate, which causes larger deterioration to image quality, is used for the outer ICM that is not important in terms of the capturing intention. Note that the operations of the compression coding unit 401 and the extension decoding unit 402 are the same as those in FIG. 16.

When the image-capturing apparatus is moved quickly, an out-of-focus state referred to as blurring occurs, which leads to deterioration in image quality which does not allow recognition of details of the object. Accordingly, by moving the image-capturing apparatus to the extent not causing blurring, and further covering the movement of the image-capturing apparatus by foreseeing the frame area, it is possible to achieve a balance between the minimization of the object-missing capturing and the image quality. For an unattended monitoring camera, for example, a balanced combination of wide angle and narrow angle is necessary for recording the details of the interesting object while holding the interesting object within the angle of view. Thus, a method of securing wide-angle capturing, by moving a narrow-angle camera through panning and tilting, is adopted. This embodiment can produce an effect of achieving the purpose in a short time, when the operator watching the surveillance footage detects, in the middle of panning and tilting, the current object and turns the camera instantaneously toward the current object.

Sixth Embodiment

In the present embodiment, an image-capturing apparatus shall be described which foresees a zoom area by automatically moving the zoom area to an area where a rapid change has occurred in the movement.

Figure 23:
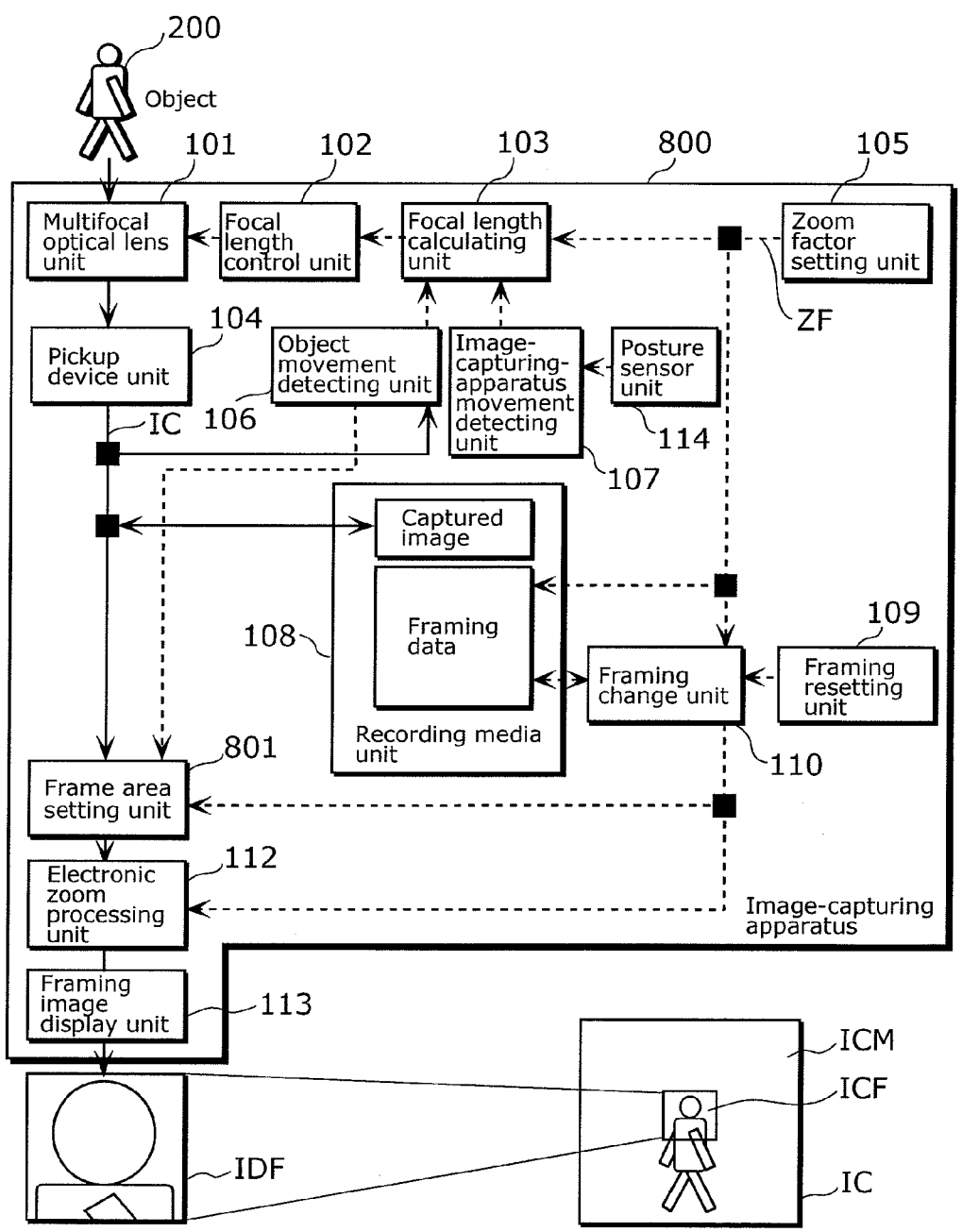
FIG. 23 is a block diagram showing the configuration of an image-capturing apparatus according to a sixth embodiment of the present invention.

FIG. 23 is a block diagram showing the configuration of an image-capturing apparatus according to a sixth embodiment of the present invention. Note that the same numerical references are given to constituent elements that are the same as those in FIG. 5, and their detailed descriptions shall be omitted.

An image-capturing apparatus 800 is an apparatus for capturing an image of the object 200, and includes: a multifocal optical lens unit 101, a focal length control unit 102, a focal length calculating unit 103, a pickup device unit 104, a zoom factor setting unit 105, an object movement detecting unit 106, an image-capturing-apparatus movement detecting unit 107, a recording media unit 108, a framing resetting unit 109, a framing change unit 110, a frame area setting unit 801, an electronic zoom processing unit 112, a framing image display unit 113, and a posture sensor 114.

The object movement detection unit 106 outputs the degree of movement of the object to the frame area setting unit 801. The frame area setting unit 801 continues monitoring the degree of movement of the object, and automatically moves the frame area ICF, when detecting a rapid change, to the area where the rapid change is detected. The rapid change in the movement is judged, as described in FIGS. 18A and 18B, by the change of the centroid position for the group of pixels in which the movement has occurred, and when the amount of change at the centroid position exceeds the threshold value, the center position of the frame area ICF is moved to the current centroid position (CP2 in FIGS. 18A and 18B), considering that the rapid movement has occurred. Conversely, when the centroid position, which continues moving for a given period of time, stops suddenly, the center position of the frame area ICF is automatically moved to the position at which the centroid position has stopped.

As described above, the zoom area is automatically assigned to a person who suddenly speeds up the movement or a person who suddenly stops moving, thereby, for example, allowing a monitoring camera to automatically capture an important area in detail.

Note that in the case where the present embodiment is applied to the monitoring camera, it becomes possible to perform more comprehensive zooming on the current area, when combined with automatic control through panning and tilting. In other words, when the centroid position for the group of pixels in which the movement has been detected is about to be off the angle of view, the frame area ICF does not fit within the angle of view and goes out of the captured image IC. This means a status in which the object with much movement is about to disappear from the angle of view, and thus, when the image-capturing apparatus 800 is turned toward the direction in which the frame area ICF has deviated outwardly from the captured image IC, the object can be captured within the angle of view. In the case where the frame area ICF deviates in a lateral direction from the captured image IC, panning is automatically controlled, and when the frame area ICF deviates in a longitudinal direction, tilting is automatically controlled.

Seventh Embodiment

In the present embodiment, an image-capturing apparatus shall be described which, when a specific color, image pattern, sound, or the like is detected, foresees the zoom area by automatically moving the zoom area in the direction of the detection.

Figure 24:
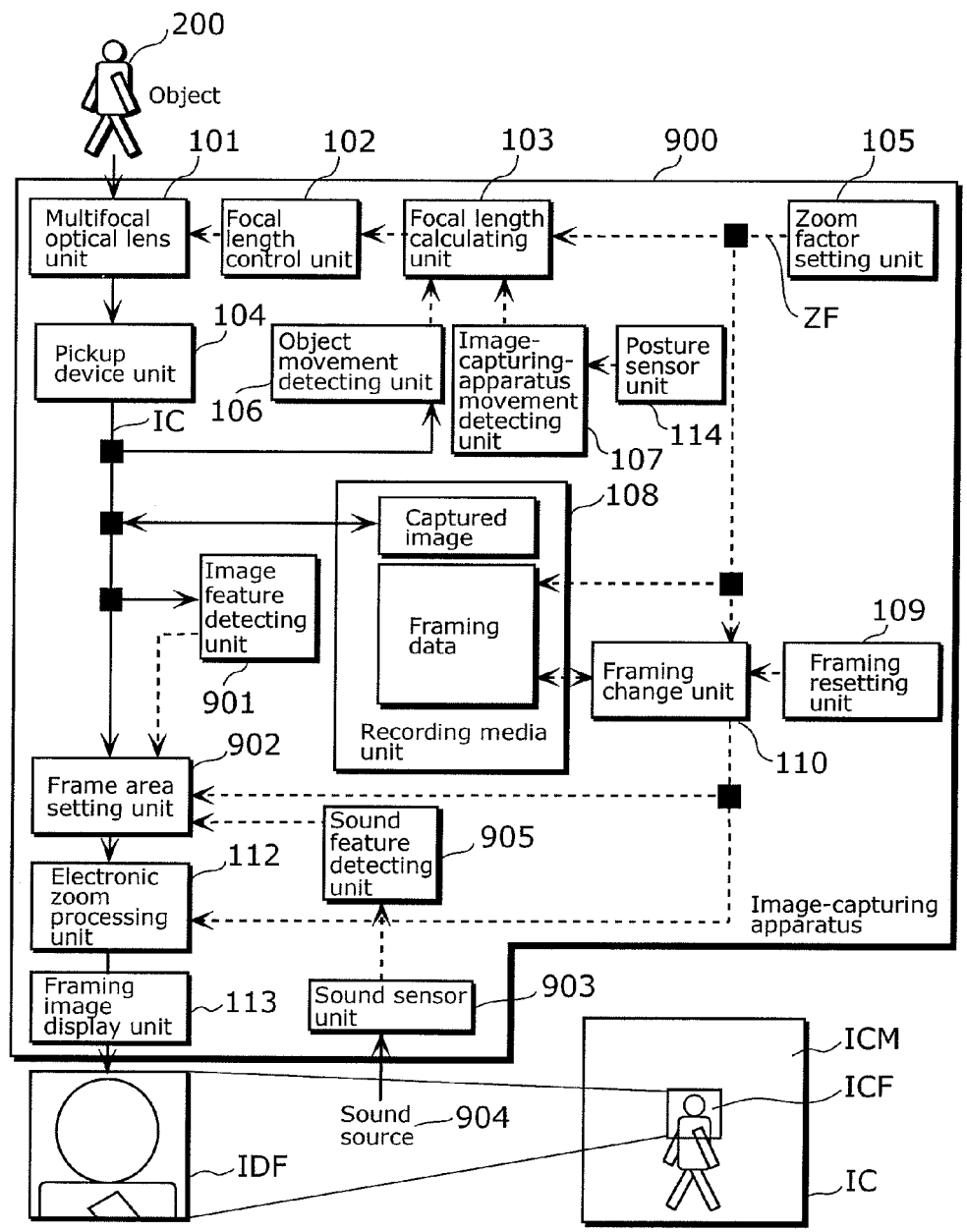
FIG. 24 is a block diagram showing the configuration of an image-capturing apparatus according to a seventh embodiment of the present invention.

FIG. 24 is a block diagram showing the configuration of an image-capturing apparatus according to a seventh embodiment of the present invention. Note that the same numerical references are given to constituent elements that are the same as those in FIG. 5, and their detailed descriptions shall be omitted.

An image-capturing apparatus 900 is an apparatus for capturing an image of the object 200, and includes: a multifocal optical lens unit 101, a focal length control unit 102, a focal length calculating unit 103, a pickup device unit 104, a zoom factor setting unit 105, an object movement detecting unit 106, an image-capturing-apparatus movement detecting unit 107, a recording media unit 108, a framing resetting unit 109, a framing change unit 110, a frame area setting unit 902, an electronic zoom processing unit 112, a framing image display unit 113, and a posture sensor 114, an image feature detecting unit 901, a sound sensor unit 903, and a sound feature detecting unit 905.

The image feature detecting unit 901 detects a specific color or a specific image pattern in the captured image IC. The specific color is determined by pixel values, for example, a gray of which all the RGB-values are 100 to 120, or a red of which the R-value is 200 or more and the G- and B-values are 10 or less. The type of the pixel value is arbitrary, and it is possible to select from among: YUV, HVC, and colorimetric values such as XYZ and LAB. The specific image pattern is, for example, a feature vector that is formed, by dividing the captured image IC into 5×5 pixel blocks, so as to include a pixel value of 25 pixels as elements. For example, when a specific character is intended to be detected, a feature vector is obtained in advance, by dividing the textual image into blocks and holding the feature vector in the image feature detecting unit 901. An inner product of such feature vectors for the textual image is calculated for each of the blocks in the captured image IC, and when the inner product exceeds the threshold value, it is proved that the character has been detected. The image feature detecting unit 901, when detecting the specific color or image pattern, outputs the positional information on the detection point to the frame area setting unit 902. The frame area setting unit 902 moves the center position of the frame area ICF to the center position of the detection point. In addition, in the case where plural specific colors or image patterns are detected at the same time, the frame area setting unit 902 moves the frame area ICF so that all of these are included.

As described above, when a specific color or pattern is detected, the zoom area is automatically assigned to the specific color or pattern, thereby, for example, allowing a monitoring camera to automatically capture an important area in detail.

The sound sensor unit 903 senses the sound from a sound source 904. In order to specify the position of the sound source 904, plural directional microphones are incorporated, so as to specify the position of the sound source 904 according to the level of sound volume. The sound feature detecting unit 905 has a threshold value for change in sound volume, and outputs, to the frame area setting unit 902, the positional information of the sound source 904 in the case where a loud noise is suddenly heard, where the sound volume suddenly falls, or where a sound having a specific frequency pattern is detected. The frame area setting unit 902, having received the positional information of the sound source 904, sets the frame area ICF, with the position of the sound source in the captured image IC being the center position of the frame area ICF.

As described above, a specific event, such as the case where the sound suddenly becomes louder or smaller, or where a sound having a specific frequency pattern is generated, is detected by change or generation of the sound, so that the zoom area is automatically assigned, thereby, for example, allowing a monitoring camera to automatically capture an important area in detail.

Eighth Embodiment

In the present embodiment, an image-capturing apparatus which allows a photographer to adjust advanced settings for the operations described in the embodiments from the first to the seventh.

Figure 25:
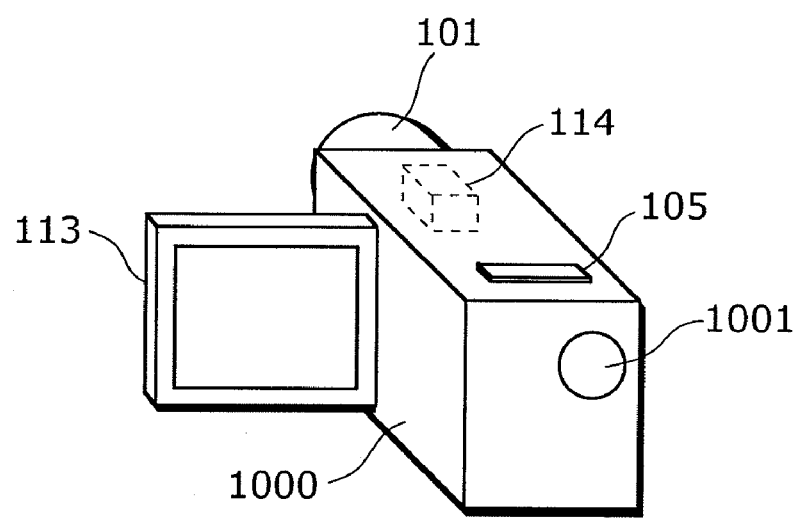
FIG. 25 is an external view of an image-capturing apparatus according to an eighth embodiment of the present invention.
Figure 26:
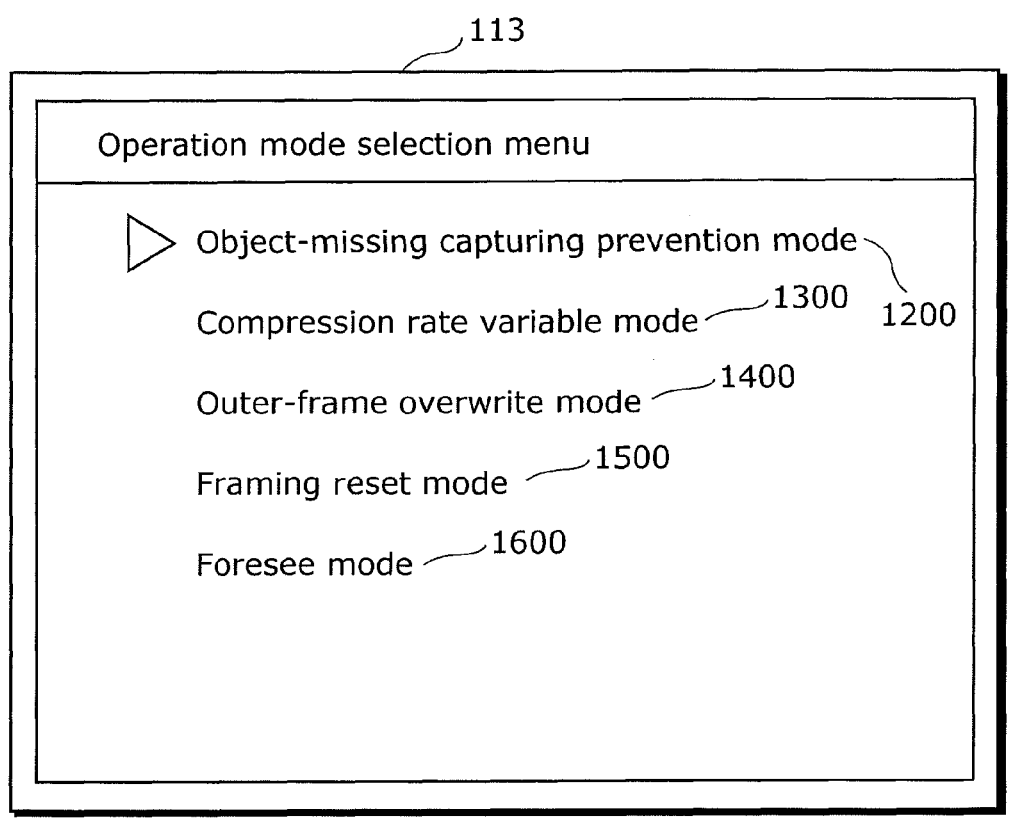
FIG. 26 is a diagram showing a selection screen for an operation mode.

FIG. 25 shows the overview of an image-capturing apparatus according to an eighth embodiment of the present invention. FIG. 26 shows an operation mode selection screen, and a method for setting the conditions for each operation mode shall be described using figures from FIG. 27 to FIG. 34.

As shown in FIG. 25, an image-capturing apparatus 1000 has an operation mode selection and adjustment dial unit 1001, and by operating this, the operational mode intended to be set for change is selected from the operation mode selection screen shown in FIG. 26. It is assumed that each operation mode is referred to as: an object-missing capturing prevention mode 1200, a compression rate variable mode 1300, an outer-frame overwrite mode 1400, a framing resetting mode 1500, and a foresee mode 1600. In this example, the object-missing capturing prevention mode 1200 is selected.

Figure 27:
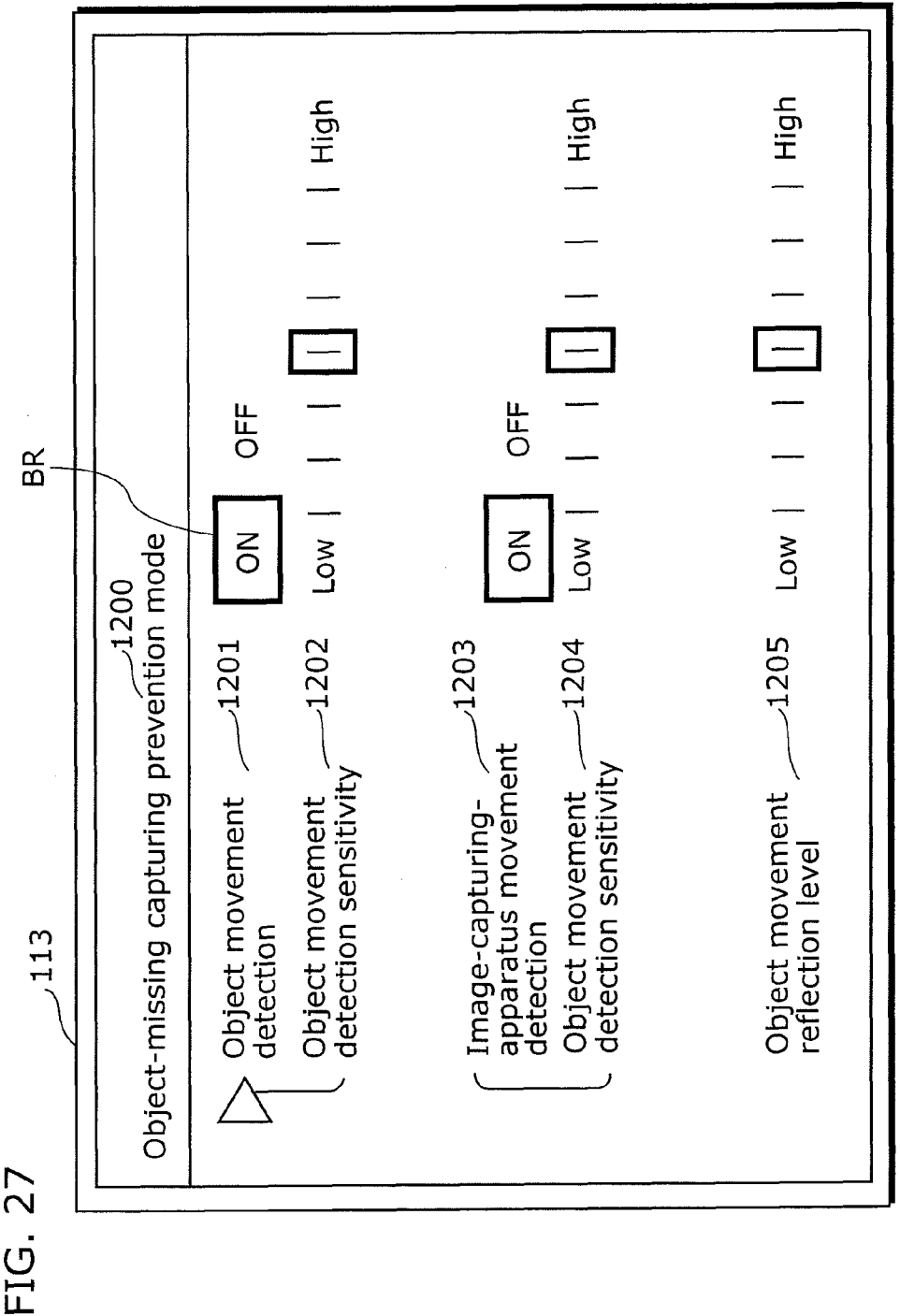
FIG. 27 is a diagram showing a setting screen for an object-missing capturing prevention mode.

FIG. 27 shows a setting screen for the object-missing capturing prevention mode 1200, which is displayed in the framing image display unit 113. A heavy-line square BR is selected as the set value for each menu. When object movement detection 1201 is ON, the object movement detecting unit 106 in FIG. 5 becomes active. When object movement detection sensitivity 1202 is set high, it is judged that the movement of the object has occurred, even when the number of pixels for the movement-detecting pixels shown in FIGS. 7A and 7B is relatively small. When the object movement detection sensitivity 1202 is set low, it is judged that the movement of the object has occurred, when the number of pixels for the movement-detecting pixels, shown in FIGS. 7A and 7B, is relatively large. When image-capturing-apparatus movement detection 1203 is ON, the image-capturing-apparatus movement detecting unit 107 in FIG. 5 becomes active. When image-capturing-apparatus movement detection sensitivity 1204 is set high, it is judged that the movement of the image-capturing apparatus has occurred, even when the amount of change in the posture sensor 114 shown in FIG. 9 is relatively small. When the image-capturing-apparatus movement detection sensitivity 1204 is set low, it is judged that the movement of the image-capturing apparatus has occurred, when the amount of change in the posture sensor 114 is relatively large. Object movement reflection level 1205 indicates sensitivity for the size adjustment of the frame area ICF, as shown in FIG. 17, according to the degree of movement of the object. When the object movement reflection level 1205 is high, the size of the frame area ICF changes sensitively even when the movement of the object is relatively slow. Conversely, when the object movement reflection level 1205 is low, the size of the frame area ICF does not change rapidly even when the movement of the object is relatively fast.

Figure 28:
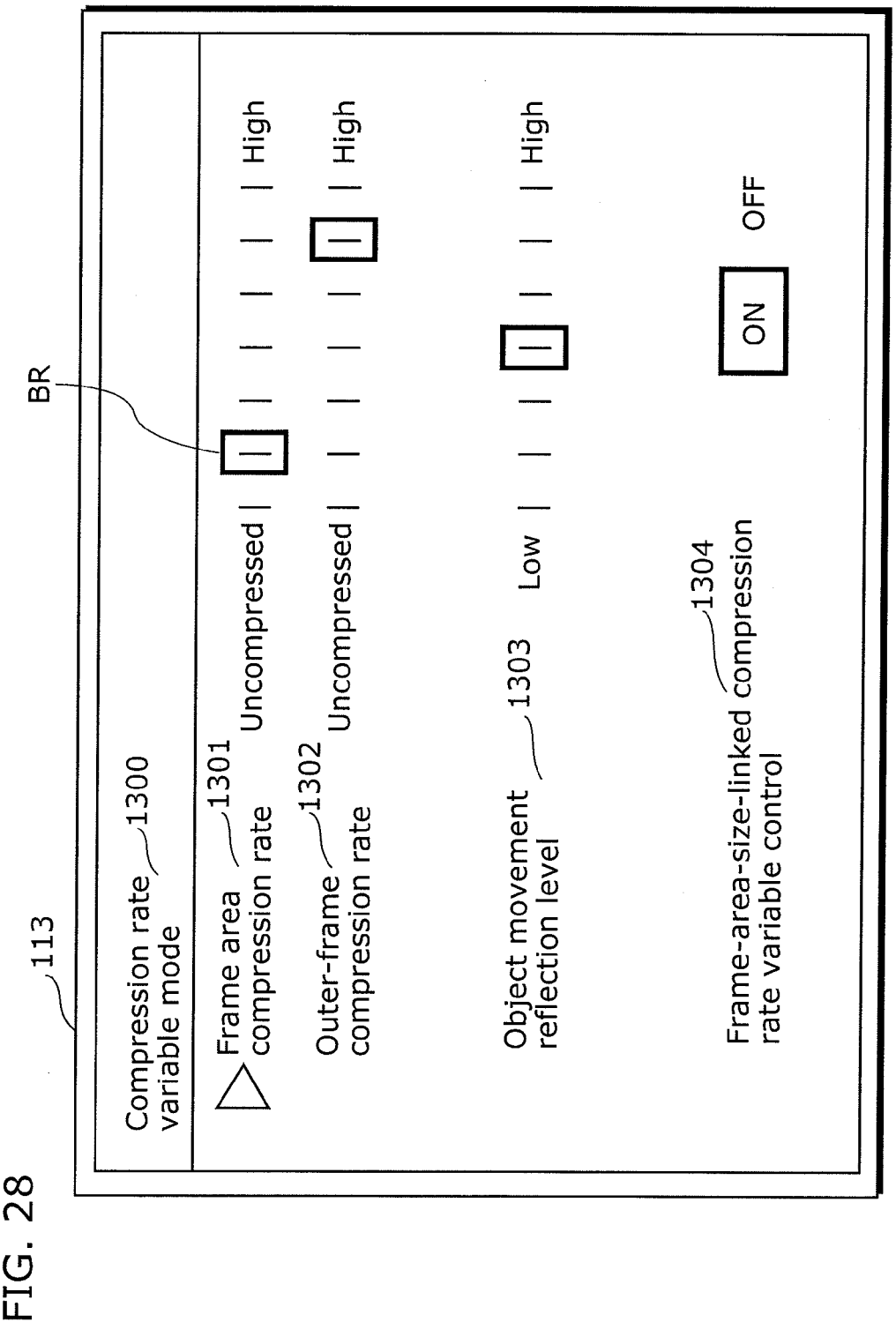
FIG. 28 is a diagram showing a setting screen for a compression rate variable mode.

FIG. 28 is a setting screen for a compression rate variable mode 1300 displayed in the framing image display unit 113. A heavy-line square BR is selected as a set value for each menu. Frame area compression rate 1301 sets the compression rate for the image compression process that the compression coding unit 401 in FIG. 16 performs on the frame area ICF. Outer-frame compression rate 1302 sets the compression rate for the image compression process that the compression coding unit 401 performs on the outer-frame area ICM. In this example, a lower compression rate is applied to the frame area ICF, and a higher compression rate is applied to the outer-frame area ICM, thereby reducing the volume to be recorded on the recording media unit 108. Object movement reflection level 1303 indicates sensitivity for the size adjustment of the frame area ICF, as shown in FIG. 17, according to the degree of movement of the object. When the object movement reflection level 1304 is high, the values set for the frame area compression rate 1301 and the outer-frame compression rate 1302 are applied sensitively to the compression coding unit 501, even when the movement of the object is relatively slow. Conversely, when the object movement reflection level 1304 is low, the values set for the frame area compression rate 1301 and the outer-frame compression rate 1302 are not applied rapidly to the compression coding unit 501, even when the movement of the object is relatively fast. When frame-area-size-linked compression variable control 1304 is set ON, the compression rate is set low in the case where the frame area ICF is small, and the compression rate is set high in the case where the frame area ICF is large. In the case where the degree of movement of the object detected by the method shown in FIGS. 18A and 18B or the degree of the movement of the image-capturing apparatus 100 detected by the posture sensor in FIG. 9 is large, the size of the frame area ICF becomes smaller with the outer-frame area being secured larger, so as to keep the object-missing capturing to a minimum.

Figure 29:
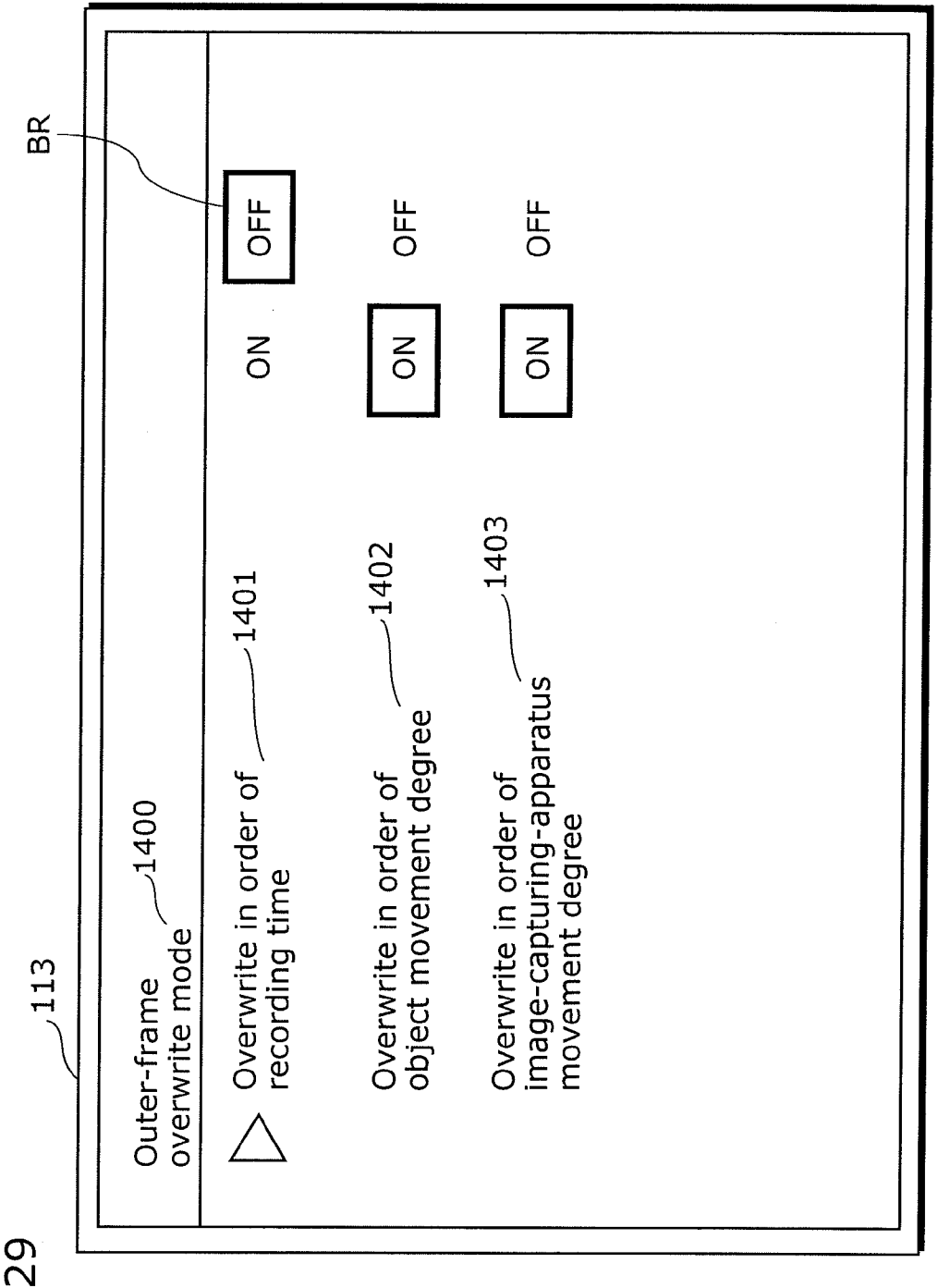
FIG. 29 is a diagram showing a setting screen for an outer-frame overwrite mode.

FIG. 29 is a setting screen for the outer-frame overwrite mode 1400 displayed in the framing image display unit 113. A heavy-line square BR is selected as a set value for each menu. Overwrite in order of recording time 1401 overwrites the frame area ICF in an order of recording time at which the outer-frame area ICM is recorded on the recording media unit 108. With the overwrite in order of recording time 1401 being set ON, overwriting is performed starting from the oldest data with reference to the recording time in the outer-frame area ICM, when the memory capacity management unit 603 in FIG. 19 notifies to the memory address adjustment unit 602 that there is no remaining recording capacity. In overwrite in order of object movement degree 1402, the frame area ICF is overwritten, starting from the smallest degree of movement of the object, with reference to the degree of movement of the object that is stored in the captured image data unit 601 in FIG. 20. With the overwrite in order of object movement degree 1402 being set ON, overwriting is performed, starting from the data having the smallest degree of movement with reference to the degree of movement of the object, when the memory capacity management unit 603 in FIG. 19 notifies to the memory address adjustment unit 602 that there is no remaining recording capacity. In overwrite in order of image-capturing-apparatus movement degree 1403, the frame area ICF is overwritten, starting from the smallest degree of movement of the object, with reference to the degree of movement of the object that is stored in the captured image data unit 601 in FIG. 20. With the overwrite in order of image-capturing-apparatus movement degree 1403 being set ON, overwriting is performed, starting from the data having the smallest degree of movement of the image-capturing apparatus with reference to the degree of movement of the image-capturing apparatus, when the memory capacity management unit 603 in FIG. 19 notifies to the memory address adjustment unit 602 that there is no remaining recording capacity. In the example of FIG. 29, since the overwrite in order of object movement degree 1402 and the overwrite in order of image-capturing-apparatus movement degree 1403 are ON, the outer-frame area ICM is overwritten with the frame area ICF, starting from the smallest degree of movement that is a combination of the degrees of movement of the object and movement of the image-capturing apparatus. For the method of combining the degree of movement of the object and the degree of movement of the image-capturing apparatus, multiplication is used, for example.

Figure 30:
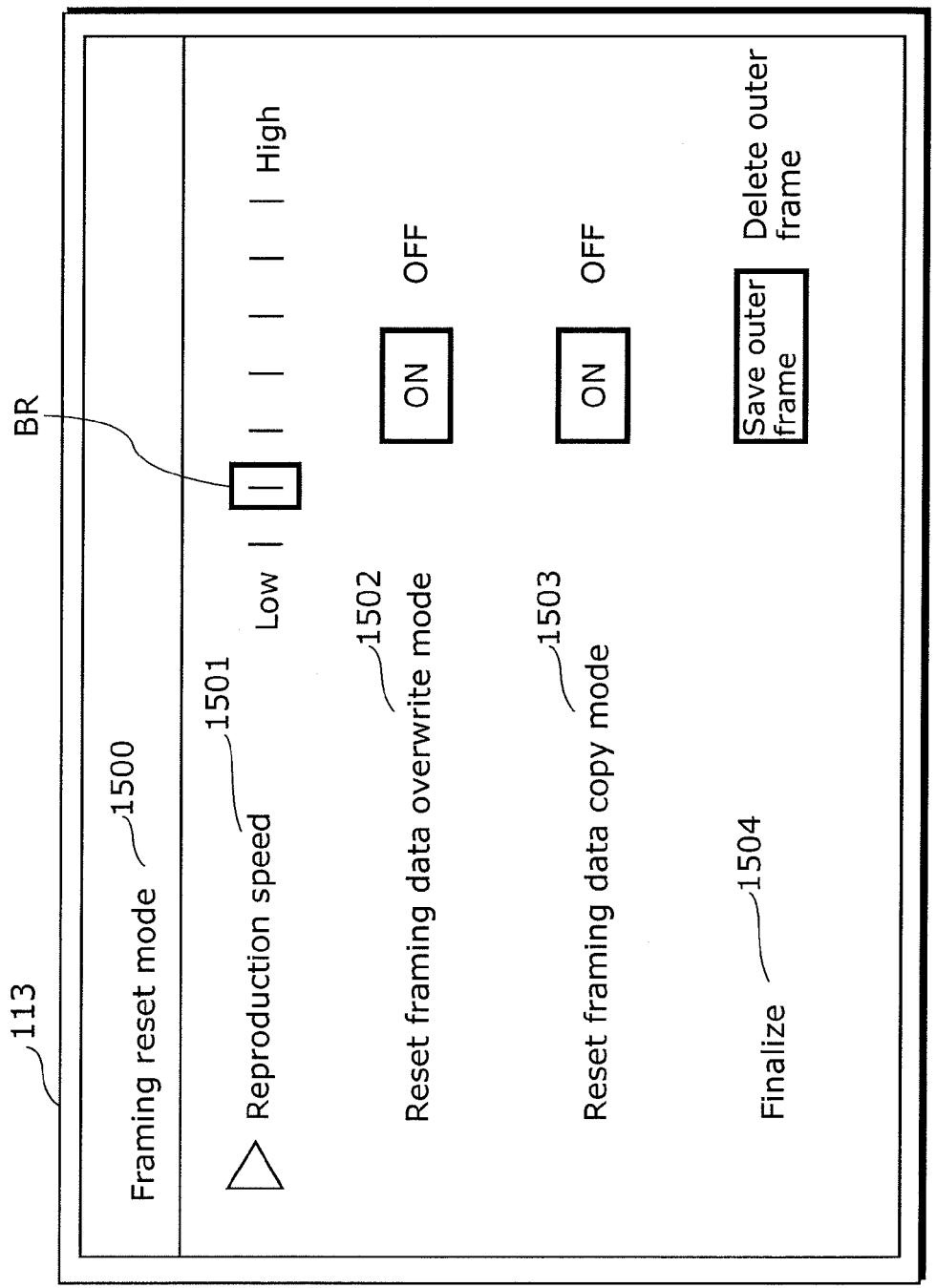
FIG. 30 is a diagram showing a setting screen for a framing resetting mode.

FIG. 30 is a setting screen for the framing reset mode 1500 displayed in the framing image display unit 113. A heavy-line square BR is selected as a set value for each menu. Reproduction speed 1501 is a speed at which the captured image is read out from the recording media unit 108, and this becomes a refresh rate for the framing image IDF in the framing image display unit 113. The mode is used for changing reproduction speed when the framing is reset, for example, for displaying five images per second. In a reset framing data overwrite mode 1502, the result of the framing resetting is overwritten to the framing data at the time of capturing. In other words, the framing change unit 110 in FIG. 5 rewrites only the framing data, and does not access the captured image. Therefore, it is possible to further continue the resetting of the framing. A reset framing data copy mode 1503 newly stores the reset framing data in the recording media unit 108. That is, no data is deleted in the recording media unit 108. In the example of FIG. 30, since the reset framing data overwrite mode 1502 and the reset framing data copy mode 1503 are ON, provisional modification is made in the copy mode; the modified result is reproduced, and confirmed in the framing image display unit 113; and then, the overwrite mode is performed. In finalize 1504, whether the outer-frame area ICM is saved or deleted is selected when the framing reset is settled. By saving the outer-frame area ICM, it is possible to repeatedly modify the framing, but the capacity of the recording media unit 108 is largely consumed. By deleting the outer-frame area ICM, it is possible to save the capacity of the recording media unit 108, but the framing cannot be reset.

Figure 31:
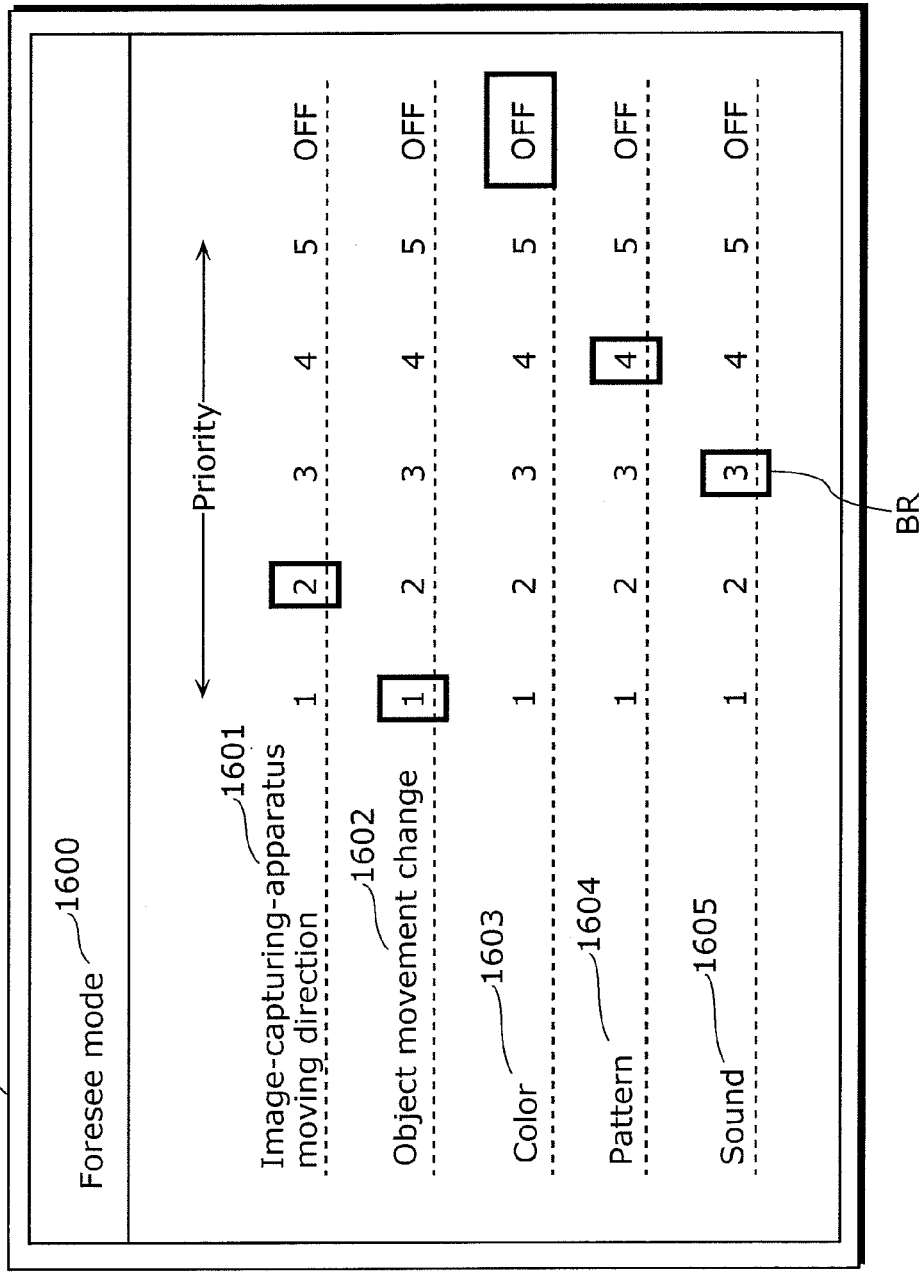
FIG. 31 is a diagram showing a setting screen for a foresee mode.
Figure 32:
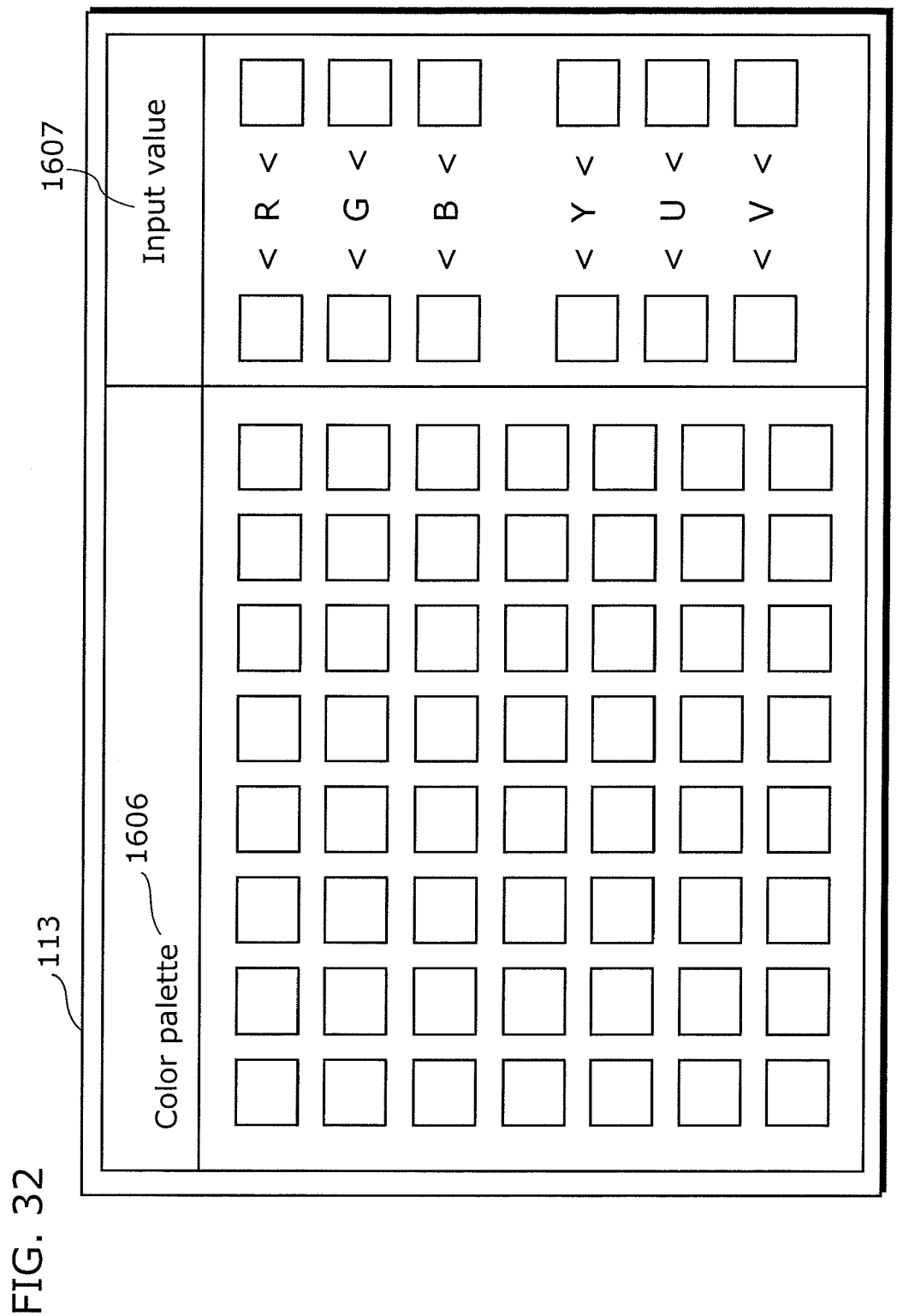
FIG. 32 is a diagram describing a color palette 1606 used for specifying a specific color in an image feature detecting unit.
Figure 33:
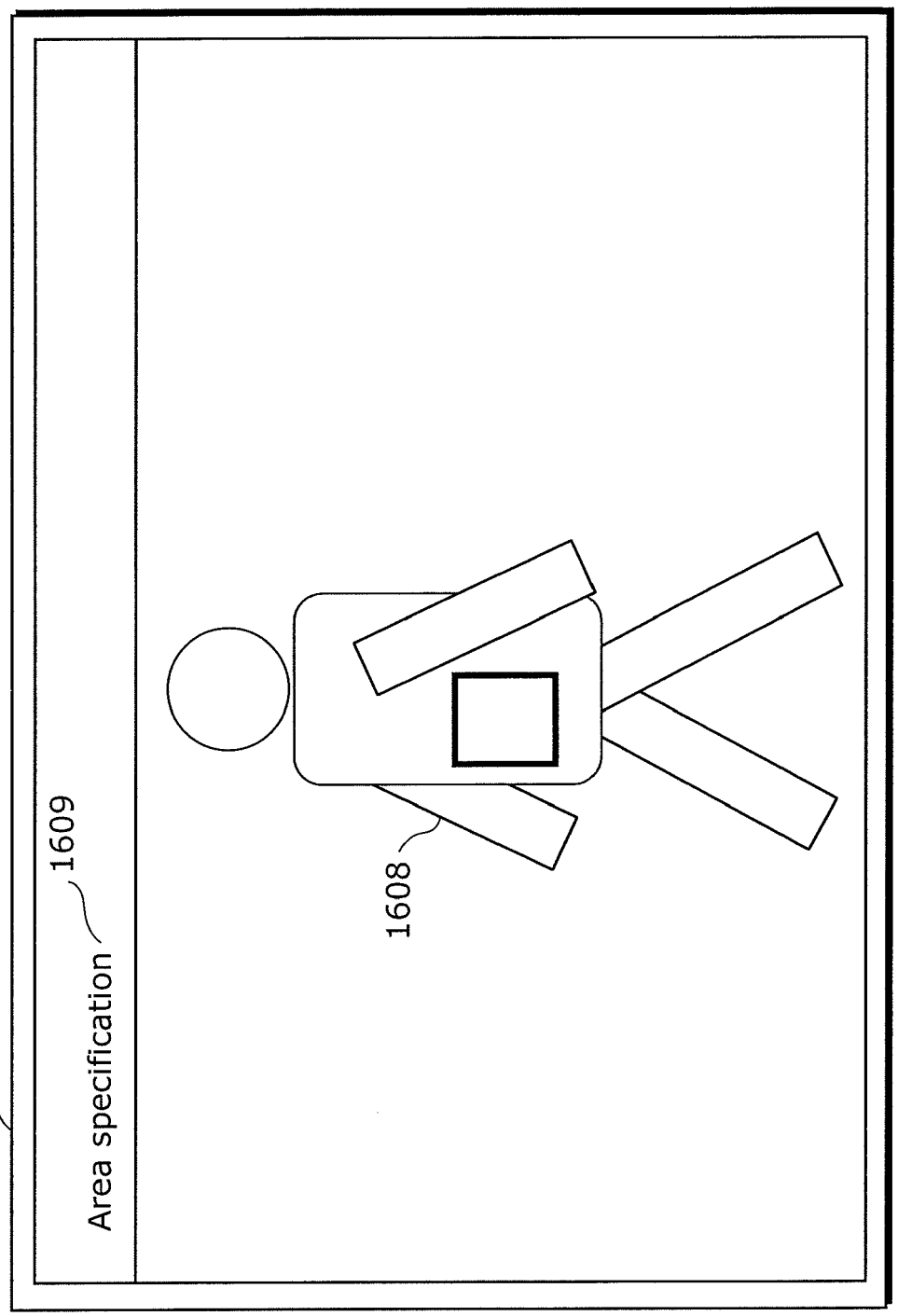
FIG. 33 is a diagram describing area specification 1609 used for specifying a specific color in an image feature detecting unit.
Figure 34:
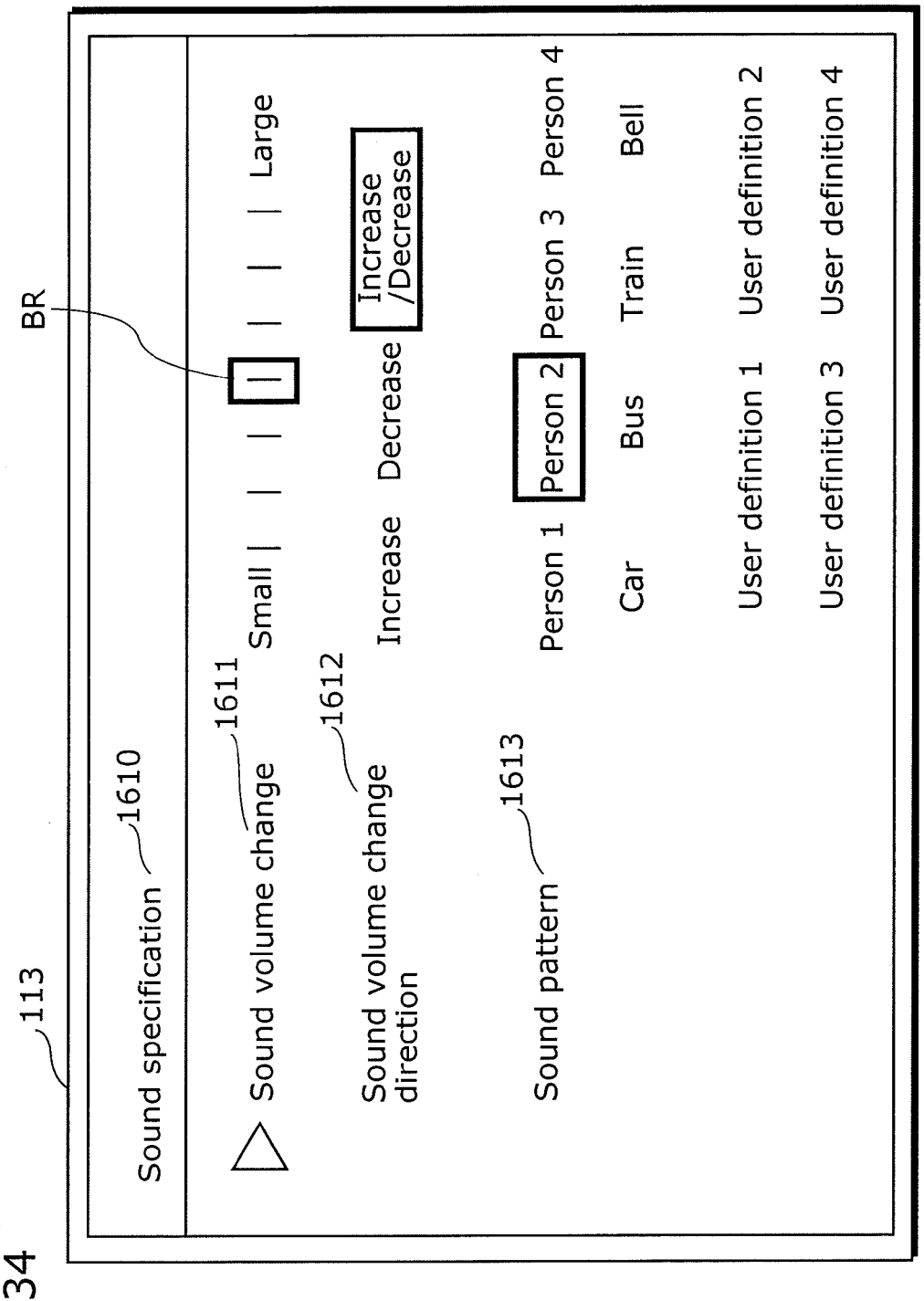
FIG. 34 is a diagram showing a setting screen for specifying a sound in a sound feature detecting unit.

FIG. 31 is a setting screen for a foresee mode 1600 displayed in the framing image display unit 113. A heavy-line square BR is selected as a set value for each menu. Image-capturing-apparatus moving direction 1601 performs, as described in FIG. 22, cumulative monitoring of the posture information from the posture sensor 114, and moves, anticipating, the frame area ICF in the moving direction of the image-capturing apparatus 700. Object movement change 1602 performs, as described in FIG. 23, cumulative monitoring of the movement information from the object movement detection unit 106, detects an object that suddenly speeds up the movement or suddenly stops moving, and moves the frame area ICF to the centroid position for the movement detection. In color 1603, a specific color is preset, as described in FIG. 24, in the image feature detection unit 901 using RGB values or YUV values. For specifying the specific color, as shown in FIG. 32, the following methods are used: a method using a color palette 1606, a method of the input value 1607, and area specification 1609, as shown in FIG. 33, for specifying an area 1608 on the captured image. In pattern 1604 in FIG. 31, with a specific pattern being preset in the image feature detecting unit 901, and when the same pattern is detected in the captured image, the frame area ICF moves to the position of the detected pattern. For inputting the specific pattern, likewise as in FIG. 33, area specification 1609 for specifying an area 1608 on the captured image is used. In sound 1605, the frame area ICF is moved, as described in FIG. 24, in the direction in which a rapid change in sound volume has occurred or in a direction in which a sound having a specific frequency pattern has been detected. The sound feature detecting unit 905 holds the conditions set in FIG. 34, and detects sound volume change amount 1611, sound volume change direction 1612, sound pattern 1613 of the sound information from the sound sensor 904. For the sound pattern 1613, plural types of human voices (for example, the voices of a man, a woman, a child, and an adult) and sounds of a car, a bus, a train, a bell, and so on are recorded in the memory included in the sound feature detecting unit 905. In addition, by providing a user definition area in the memory included in the sound feature detecting unit 905, it is possible to record the voice of the user or the family.

Note that in each of the modes, initial values for set values are recorded in the memory for activating the image-capturing apparatus, and the settings are changed by the photographer where necessary. In addition, the set value, when changed, is recorded in the memory for activating the image-capturing apparatus, so that the operation can be started, in the next activation, on the condition set by the photographer.

As described above, the operations, which have been described in the embodiments from the first to the seventh, can be divided in plural modes according to the function, and the photographer can adjust the setting condition for each mode. With this, it becomes possible, while reliably preventing the object-missing capturing, to achieve video-capturing with higher flexibility, giving more priority to the recording time, or giving more priority to the image quality.

Ninth Embodiment

In the present embodiment, an image-capturing apparatus shall be described which provides plural methods for displaying an optical zoom image and an electronic zoom image.

Figure 35A:
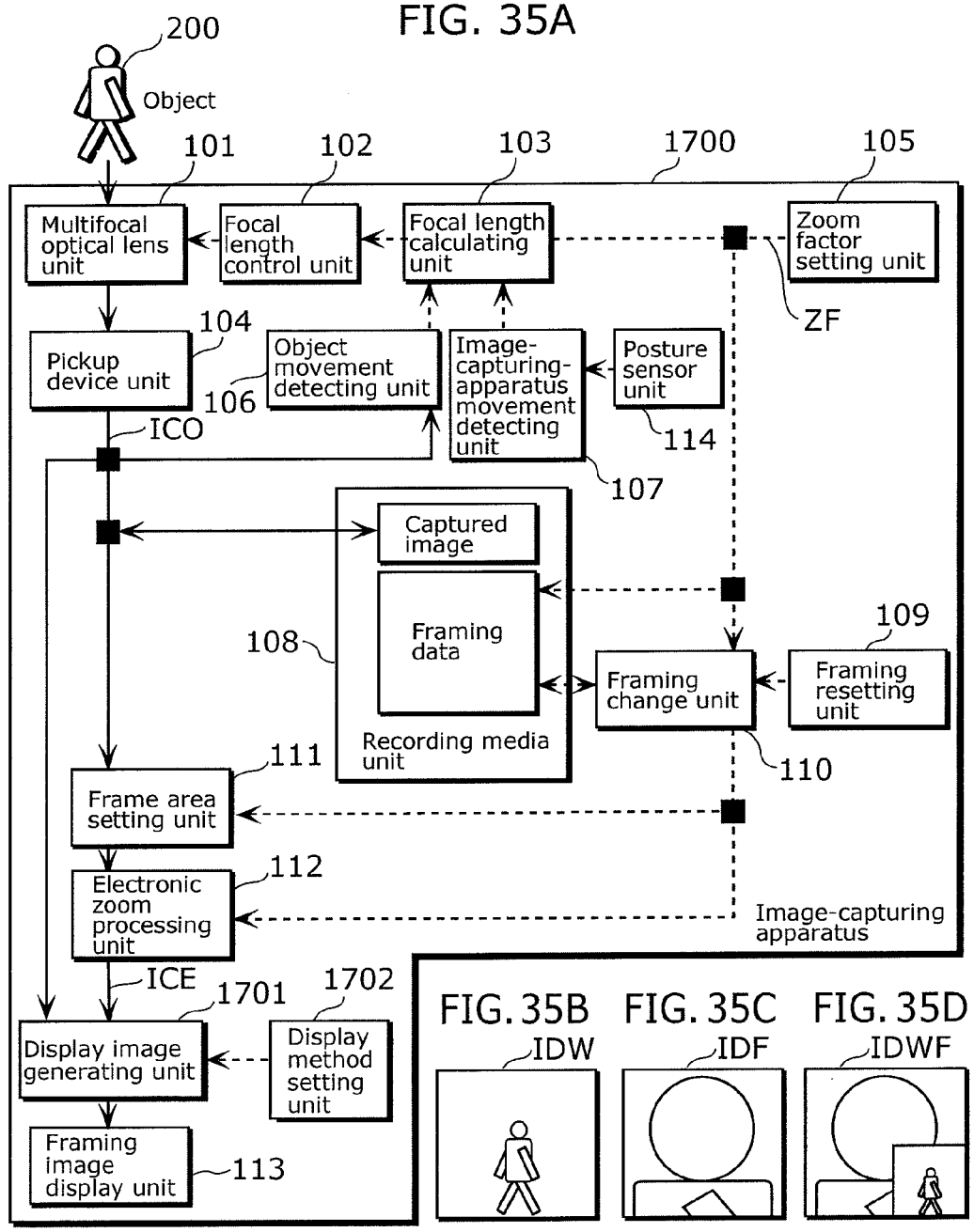
FIG. 35A is a block diagram showing the configuration of an image-capturing apparatus according to a ninth embodiment of the present invention.

FIG. 35A is a block diagram showing the configuration of an image-capturing apparatus according to a ninth embodiment of the present invention. Note that the same numerical references are given to constituent elements that are the same as those in FIG. 5, and their detailed descriptions shall be omitted.

An image-capturing apparatus 1700 is an apparatus for capturing an image of the object 200, and includes: a multi-focal optical lens unit 101, a focal length control unit 102, a focal length calculating unit 103, a pickup device unit 104, a zoom factor setting unit 105, an object movement detecting unit 106, an image-capturing-apparatus movement detecting unit 107, a recording media unit 108, a framing resetting unit 109, a framing change unit 110, a frame area setting unit 701, an electronic zoom processing unit 112, a framing image display unit 113, a posture sensor 114, a display image generating unit 1701, and a display method setting unit 1702.

Figure 35B:
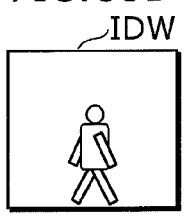
FIG. 35B is a diagram showing an image captured by the image-capturing apparatus according to the ninth embodiment of the present invention.
Figure 35C:
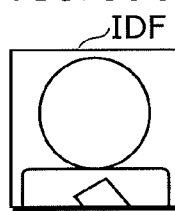
FIG. 35C is a diagram showing an image captured by the image-capturing apparatus according to the ninth embodiment of the present invention.
Figure 35D:
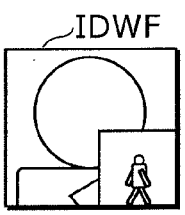
FIG. 35D is a diagram showing an image captured by the image-capturing apparatus according to the ninth embodiment of the present invention.

In the display image generating unit 1701, an optical zoom image ICO is obtained from the pickup device unit 104, and an electronic zoom image IEC is obtained from the electronic zoom processing unit 112. The object movement detecting unit 106 captures the movement of the object 200 that is walking, and the multifocal optical lens unit 101 is set to wide-angle, so as to capture a wide-angle image like, for example, an image IDW shown in FIG. 35B. In addition, a zoom factor ZF for magnification capturing (for example, 4-power) is assigned from the zoom factor setting unit 105 to the zoom processing unit 112, and a magnified image in which the face of the object 200 is magnified, like the image IDF shown in FIG. 35C, is generated. Furthermore, the display image generating unit 1701 receives an instruction, from the display method setting unit 1702, for one of the following methods of: displaying only the optical zoom image ICO in the framing image display unit 113 (ICO mode); displaying only the electronic-zoom image IEC in the framing image display unit 113 (ICE mode); and displaying both of the optical zoom image ICO and the electronic zoom image IEC in the framing image display unit 113 (ICOE mode). In the case of the ICO mode, the photographer can see the image IDW in the framing image display unit 113; that is, the photographer can confirm the framing for wide-angle capturing including the outer-frame area ICM. In addition, in the case of the ICE mode, the photographer can see the image IDF in the framing image display unit 113; that is, the photographer can confirm the framing of the frame area ICF for magnification capturing. In addition, in the case of the ICOE mode, the photographer can see, in the framing image display unit 113, the image IDWF shown in FIG. 35D; that is, the photographer can confirm the framing for the frame area ICF for magnification capturing and the framing for wide-angle capturing including the outer-frame area at the same time.

As described above, the photographer can confirm plural framings, by selecting between the optical zoom image and the electronic zoom image, or selecting both at the same time. The photographer can confirm allowances for resetting the framing by looking at the optical zoom image. In addition, by looking at both the optical zoom image and electronic zoom image at the same time, the photographer is able to check the status of an outer side of the angle of view that is captured in the framing area ICF, and to find an event which has abruptly occurred, or notice a new object coming into the angle of view of the multifocal optical lens, and thereby can determine the framing in electronic zoom at the same time while preventing the object-missing capturing.

INDUSTRIAL APPLICABILITY

An image-capturing apparatus according to the present invention, when the movement of an object or the movement of the image-capturing apparatus is detected, changes the optical zoom to wide angle so as to keep object-missing capturing to a minimum, and generates a display image in electronic zoom. In addition, when movement is not detected in the object or the image-capturing apparatus, only an image captured in optical zoom is stored on a recording medium, thereby extending recording time. Thus, by providing the image-capturing apparatus in a commercial-use video camera, it becomes possible to enjoy reliable video capturing in sports and entertainment. In addition, by providing this apparatus in a monitoring camera, it becomes possible to capture, without fail, an image of an object that is important in terms of the purpose of monitoring, according to the movement, color, pattern, and sound of the object, and to record detailed image information by zooming.

The invention claimed is:

1. An image-capturing apparatus which captures an image of an object while changing a zoom factor by control of a focal length of a multifocal optical lens, said image-capturing apparatus comprising:

an object movement detecting unit operable to detect a movement of the object;

an image-capturing-apparatus movement detecting unit operable to detect a movement of said image-capturing apparatus;

a focal length calculating unit operable to calculate the focal length of the multifocal optical lens so that the zoom factor becomes lower than a set zoom factor in at least one of the cases where the movement of the object is detected by said object movement detecting unit, and where the movement of said image-capturing apparatus is detected by said image-capturing-apparatus movement detecting unit, and to calculate the focal length of the multifocal optical lens so that the zoom factor becomes equivalent to the set zoom factor in the cases where the movement of the object is not detected by said object movement detecting unit, and where the movement of said image-capturing apparatus is not detected by said image-capturing-apparatus movement detecting unit;

a focal length control unit operable to control the focal length so that the focal length of the multifocal optical lens is adjusted to the focal length calculated by said focal length calculating unit;

a frame area setting unit operable to clip a frame area out of the optical zoom image having been formed through the multifocal optical lens, the frame area being an area of which a position and a size are determined according to the zoom factor;

an electronic zoom processing unit operable to change the size of the image in the frame area clipped by said frame area setting unit, through electronic zoom, to a size for displaying the image;

a framing image display unit operable to display one of an electronic zoom image and the optical zoom image, the electronic zoom image having been electronic-zoomed by said electronic zoom processing unit; and a recording media unit in which the zoom factor and the optical zoom image are stored.

2. The image-capturing apparatus according to claim 1, further comprising:

a framing resetting unit operable to reset at least one of the zoom factor stored in said recording media unit and a position of the frame area on the optical zoom image, the position of the frame area being determined according to the zoom factor; and a framing change unit operable to clip the frame area out of the optical zoom image stored in said recording media unit, using the zoom factor and the position of the frame area on the optical zoom image that have been reset by said framing resetting unit.

3. The image-capturing apparatus according to claim 1, wherein said object movement detecting unit is operable to detect the movement of the object in the optical zoom image.

4. The image-capturing apparatus according to claim 3, wherein said object movement detecting unit is operable to detect the movement of the object, using at least one of luminance difference and corresponding-point tracking for a plurality of the optical zoom images.

5. The image-capturing apparatus according to claim 1, wherein said image-capturing-apparatus movement detecting unit is operable to detect the movement of said image-capturing apparatus, using at least one of an angular velocity sensor and an acceleration sensor.

6. The image-capturing apparatus according to claim 1, wherein said electronic zoom processing unit is operable to generate a densified image feature quantity by densifying an image feature quantity independent of an image coordinate of the optical zoom image, and to generate an electronic zoom image from the densified image feature quantity.

7. The image-capturing apparatus according to claim 1, further comprising:
a compression coding unit operable to perform compression coding on an image in the frame area and an image in an outer-frame area at separate compression rates, the outer-frame area being an area other than the frame area within the optical zoom image; and
an extension decoding unit operable to perform extension decoding on the images in the frame area and the outer-frame area that have been compression-coded at the separate compression rates.

8. The image-capturing apparatus according to claim 7, wherein said compression coding unit is operable to perform compression coding on the outer-frame area at a lower compression rate when the degrees of movement of the object and movement of said image-capturing apparatus are larger.

9. The image-capturing apparatus according to claim 1, further comprising:
an address adjustment unit operable to manage addresses of the frame area and an outer-frame area separately on said recording media unit, the outer-frame area being an area other than the frame area within the optical zoom image; and
a capacity management unit operable to overwrite the address of the outer-frame area with data in the frame area, in the case where a recording capacity of said recording media unit has reached an upper limit.

10. The image-capturing apparatus according to claim 9, wherein said capacity management unit is operable to overwrite the outer-frame area with the data in the frame area, starting from the outer-frame area at a point where the degree of movement of the object and the degree of movement of said image-capturing apparatus are smaller, in the case where the recording capacity of said recording media unit has reached the upper limit.

11. The image-capturing apparatus according to claim 1, wherein said frame area setting unit is operable to detect regularity from the movement of said image-capturing apparatus detected by said image-capturing-apparatus movement detecting unit, and to move, based on the detected regularity, the frame area within the optical zoom image in order to foresee the framing.

12. The image-capturing apparatus according to claim 1, wherein said frame area setting unit is operable to move the frame area within the optical zoom image to an area in which the movement of the object has been detected, in the case where the movement of the object detected by said object movement detecting unit is larger than a predetermined change.

13. The image-capturing apparatus according to claim 1, further comprising
an image feature detecting unit operable to detect, from the optical zoom image, at least one of a specific color and a specific image pattern,
wherein said focal length calculating unit is operable to calculate the focal length of the multifocal optical lens so that the zoom factor becomes lower than the set zoom factor in the case where at least one of the specific color and the specific image pattern is detected by said image feature detecting unit, and
said frame area setting unit is operable to move the frame area within the optical zoom image so that the specific color and the specific image pattern which are detected by said image feature detecting unit are included in the frame area.

14. The image-capturing apparatus according to claim 1, comprising
a display method setting unit operable to accept selection of an image to be displayed by said framing image display unit, the image being selected from among the optical zoom image, the electronic zoom image, and both of the optical zoom image and the electronic zoom image,
wherein said framing image display unit is operable to display the image selected, by said display method setting unit, from among the optical zoom image, the electronic zoom image, and both of the optical zoom image and the electronic zoom image.

15. An image-capturing method for capturing an image of an object while changing a zoom factor by control of a focal length of a multifocal optical lens, said image-capturing method comprising:
an object movement detecting step of detecting a movement of the object;
an image-capturing-apparatus movement detecting step of detecting a movement of an image-capturing apparatus;
a focal length calculating step of calculating the focal length of the multifocal optical lens so that the zoom factor becomes lower than a set zoom factor in at least one of the cases where the movement of the object is detected in said object movement detecting step, and where the movement of the image-capturing apparatus is detected in said image-capturing-apparatus movement detecting step, and of calculating the focal length of the multifocal optical lens so that the zoom factor becomes equivalent to the set zoom factor in the cases where the movement of the object is not detected in said object movement detecting step, and where the movement of the image-capturing apparatus is not detected in said image-capturing-apparatus movement detecting step;
a focal length control step of controlling the focal length so that the focal length of the multifocal optical lens is adjusted to the focal length calculated in said focal length calculating step;
a frame area setting step of clipping a frame area out of the optical zoom image having been formed through the multifocal optical lens, the frame area being an area of which a position and a size are determined according to the zoom factor;

an electronic zoom processing step of changing the size of the image in the frame area clipped in said frame area setting step, through electronic zoom, to a size for displaying the image;

a framing image display step of displaying one of an electronic zoom image and the optical zoom image, the electronic zoom image having been electronic-zoomed by said electronic zoom processing unit; and a recording step of storing the zoom factor and the optical zoom image.

16. A program stored in a recording medium for capturing an image of an object while changing a zoom factor by control of a focal length of a multifocal optical lens, said program causing a computer to execute:

an object movement detecting step of detecting a movement of the object;

an image-capturing-apparatus movement detecting step of detecting a movement of an image-capturing apparatus;

a focal length calculating step of calculating the focal length of the multifocal optical lens so that the zoom factor becomes lower than a set zoom factor in at least one of the cases where the movement of the object is detected in the object movement detecting step, and where the movement of the image-capturing apparatus is detected in the image-capturing-apparatus movement detecting step, and of calculating the focal length of the multifocal optical lens so that the zoom factor becomes equivalent to the set zoom factor in the cases where the movement of the object is not detected in the object movement detecting step, and where the movement of the image-capturing apparatus is not detected in the image-capturing-apparatus movement detecting step;

a focal length control step of controlling so that the focal length of the multifocal optical lens is adjusted to the focal length calculated in the focal length calculating step;

a frame area setting step of clipping a frame area out of the optical zoom image having been formed through the multifocal optical lens, the frame area being an area of which a position and a size are determined according to the zoom factor;

an electronic zoom processing step of changing the size of the image in the frame area clipped in the frame area setting step, through electronic zoom, to a size for displaying the image;

a framing image display step of displaying one of an electronic zoom image and the optical zoom image, the electronic zoom image having been electronic-zoomed in the electronic zoom processing step; and a recording step of storing the zoom factor and the optical zoom image.

* * * * *

UNITED STATES PATENT AND TRADEMARK OFFICE
CERTIFICATE OF CORRECTION

PATENT NO. : 7,701,492 B2
APPLICATION NO. : 12/095384
DATED : April 20, 2010
INVENTOR(S) : Hideto Motomura et al.

It is certified that error appears in the above-identified patent and that said Letters Patent is hereby corrected as shown below:

On the Title Page

In Section (56) References Cited, under the "FOREIGN PATENT DOCUMENTS" heading, "JP  6-41281     5/1997" should read --JP    6-41281     5/1994--.

Signed and Sealed this

Sixteenth Day of November, 2010

David J. Kappos
*Director of the United States Patent and Trademark Office*